United States Patent [19]
Teicher

[11] Patent Number: 6,065,675
[45] Date of Patent: May 23, 2000

[54] PROCESSING SYSTEM AND METHOD FOR A HETEROGENEOUS ELECTRONIC CASH ENVIRONMENT

[75] Inventor: Mordechai Teicher, Kfar Saba, Israel

[73] Assignee: Cardis Enterprise International N.V., Curacao, Netherlands Antilles

[21] Appl. No.: 09/106,682

[22] Filed: Jun. 29, 1998

[30] Foreign Application Priority Data

Jun. 30, 1997 [IL] Israel ......................................... 121192

[51] Int. Cl.⁷ ..................................................... G06K 5/00
[52] U.S. Cl. .......................... 235/380; 235/379; 235/487; 235/375; 235/492; 902/2; 902/10; 902/22; 902/26; 705/35; 705/41
[58] Field of Search ..................................... 235/379, 380, 235/487, 375, 492, 440; 902/2, 10, 22, 26; 705/35, 41

[56] References Cited

U.S. PATENT DOCUMENTS

| | | | |
|---|---|---|---|
| 4,634,845 | 1/1987 | Hale et al. | 235/350 |
| 4,689,478 | 8/1987 | Hale et al. | 235/380 |
| 4,736,094 | 4/1988 | Yoshida | 235/379 |
| 4,877,950 | 10/1989 | Halpern | 235/487 |
| 4,882,474 | 11/1989 | Anderl et al. | 235/380 |
| 4,992,646 | 2/1991 | Collin | 235/375 |
| 5,030,806 | 7/1991 | Collin | 235/375 |
| 5,221,838 | 6/1993 | Gutmal et al. | 235/379 |
| 5,276,311 | 1/1994 | Hennige | 235/380 |
| 5,478,993 | 12/1995 | Derksen | 235/380 |
| 5,530,232 | 6/1996 | Taylor | 235/380 |
| 5,557,516 | 9/1996 | Hogan | 364/406 |
| 5,578,808 | 11/1996 | Taylor | 235/380 |
| 5,590,038 | 12/1996 | Pitroda | 395/241 |
| 5,623,547 | 4/1997 | Jones et al. | 380/24 |
| 5,744,787 | 4/1998 | Teicher | 235/380 |
| 5,748,737 | 5/1998 | Daggar | 380/24 |
| 5,778,067 | 7/1998 | Jones et al. | 380/24 |

*Primary Examiner*—Thien M. Le
*Assistant Examiner*—Daniel S. Fella
*Attorney, Agent, or Firm*—Darby & Darby

[57] ABSTRACT

A heterogeneous stored-value system which offers interoperability among a number of proprietary payment card brands with differing fee structures. The system makes use of existing settlement practices and fee structures to increase the amount of commerce while imposing minimal changes. The benefits of the interoperability among different proprietary brands include reduced operating costs, since a single electronic cash pool can serve many different payment card brands. Although the electronic cash of the system is generic and is shared among the different payment card brands, the flow of electronic cash is prescribed in such a manner as to maintain an association between electronic cash (over the course of circulation) and the specific brand of payment card through which it was acquired by the customer. In this way, a transaction involving electronic cash represents a small piece of a much larger charge or debit transaction and carries its proportional share of the fees of the charge or debit transaction. Electronic cash originally obtained through a specific payment card brand is reconsolidated at settlement, assuring proper accounting for these fees. Thus, electronic cash can be freely used for small purchases, and the original charge or debit transaction can benefit from the fees associated with those small purchases, but without imposing any significant transaction overhead for handling each small purchase individually. The system can handle isolated flow, where electronic cash flows from a loading device to a payment card and thence from a payment card to a point of sale to settlement, where electronic cash can flow into a payment card only from the loading device. The system can also handle circulation of the electronic cash, whereby reloading is accomplished by returning electronic cash to a payment card as change from a charge transaction at a point of sale. In addition, payment cards with more than one charge function can be handled, whereby the customer can specify which of several charge functions will be used to acquire the electronic cash.

17 Claims, 15 Drawing Sheets

| Sale # | Paid | CARD-1 Charges | | CARD-2 Charges | | CARD-3 Charges | |
|---|---|---|---|---|---|---|---|
| | | Fee 1 | Fee 2 | Fee 1 | Fee 2 | Fee 1 | Fee 2 |
| 1. | 3.90 | | | 3.90 | | | |
| 2. | 23.60 | | | | | 23.60 | |
| 3. | 1.59 | | | 1.59 | | | |
| 4. | 29.85 | | | | | | 29.85 |
| 5. | 25.54 | | | | 25.54 | | |
| 6. | 12.04 | | | | | 12.04 | |
| 7. | 10.52 | | | 10.52 | | | |
| 8. | 21.96 | | | | | 21.96 | |
| 9. | 26.43 | | | | 26.43 | | |
| 10. | 6.40 | | | 6.40 | | | |
| 491. | 12.05 | | | 12.05 | | | |
| 492. | 28.78 | | 28.78 | | | | |
| 493. | 10.74 | | | 10.74 | | | |
| 494. | 24.17 | | | 24.17 | | | |
| 495. | 5.49 | 5.49 | | | | | |
| 496. | 6.57 | | | | | 6.57 | |
| 497. | 13.85 | | | 13.85 | | | |
| 498. | 29.21 | | 29.21 | | | | |
| 499. | 28.64 | | | | 28.64 | | |
| 500. | 8.93 | | | | | 8.93 | |
| Total | 7790.09 | 1084.14 | 631.23 | 2047.45 | 1009.17 | 2353.55 | 664.54 |
| ↳31 | ↳32 | ↳33 | ↳34 | ↳35 | ↳36 | ↳37 | ↳38 |

FIG. 3

| Sale # | Paid | E-Purse Balance | E-cash received/ returned | Card type | CARD-1 Charges | CARD-2 Charges | CARD-3 Charges | E-cash Balance |
|---|---|---|---|---|---|---|---|---|
| Prime: | | | | | | | | 750.00 |
| 1. | 23.16 | 17.48 | -1.84 | CARD-1 | 25.00 | | | 748.16 |
| 2. | 7.39 | 10.39 | 7.39 | CARD-3 | | | | 755.54 |
| 3. | 3.77 | 17.51 | 3.77 | CARD-3 | | | | 759.32 |
| 4. | 7.95 | 13.02 | 7.95 | CARD-1 | | | | 767.26 |
| 5. | 28.43 | 10.36 | 0.00 | CARD-2 | | 28.43 | | 767.26 |
| 6. | 15.04 | 22.04 | 15.04 | CARD-2 | | | | 782.30 |
| 7. | 7.90 | 23.68 | 7.90 | CARD-3 | | | | 790.20 |
| 8. | 28.80 | 10.40 | 0.00 | CARD-1 | 28.80 | | | 790.20 |
| 9. | 13.08 | 15.20 | 13.08 | CARD-2 | | | | 803.28 |
| 10. | 13.49 | 10.64 | -11.51 | CARD-1 | 25.00 | | | 791.78 |
| --- | | | | | | | | |
| 491. | 21.40 | 20.09 | -3.60 | CARD-2 | | 25.00 | | 812.14 |
| 492. | 15.51 | 21.45 | 15.51 | CARD-1 | | | | 827.65 |
| 493. | 12.68 | 23.00 | 12.68 | CARD-2 | | | | 840.33 |
| 494. | 16.23 | 7.03 | -8.77 | CARD-2 | | 25.00 | | 831.56 |
| 495. | 25.36 | 15.08 | 0.00 | CARD-3 | | | 25.36 | 831.56 |
| 496. | 26.61 | 24.06 | 0.00 | CARD-3 | | | 26.61 | 831.56 |
| 497. | 22.92 | 11.43 | -2.08 | CARD-3 | | | 25.00 | 829.48 |
| 498. | 1.35 | 12.70 | 1.35 | CARD-3 | | | | 830.83 |
| 499. | 25.82 | 17.92 | 0.00 | CARD-1 | 25.82 | | | 830.83 |
| 500. | 28.84 | 18.09 | 0.00 | CARD-2 | | 28.84 | | 830.83 |
| Adjust: | | | | | | | | 80.83 |
| Total | 7537.21 | | | | 1574.55 | 2834.19 | 3047.65 | 80.83 |

FIG. 7

| Sale # | Paid | CARD-1 Charges | | CARD-2 Charges | | CARD-3 Charges | |
|---|---|---|---|---|---|---|---|
| | | Fee 1 | Fee 2 | Fee 1 | Fee 2 | Fee 1 | Fee 2 |
| 1. | 23.16 | 23.16 | | | | | |
| 2. | 7.39 | | | | | 7.39 | |
| 3. | 3.77 | | | | | 3.77 | |
| 4. | 7.95 | 7.95 | | | | | |
| 5. | 28.43 | | | | 28.43 | | |
| 6. | 15.04 | | | 15.04 | | | |
| 7. | 7.90 | | | | | 7.90 | |
| 8. | 28.80 | | 28.80 | | | | |
| 9. | 13.08 | | | 13.08 | | | |
| 10. | 13.49 | 13.49 | | | | | |
| 491. | 21.40 | | | 21.40 | | | |
| 492. | 15.51 | 15.51 | | | | | |
| 493. | 12.68 | | | 12.68 | | | |
| 494. | 16.23 | | | 16.23 | | | |
| 495. | 25.36 | | | | | | 25.36 |
| 496. | 26.61 | | | | | | 26.61 |
| 497. | 22.92 | | | | | 22.92 | |
| 498. | 1.35 | | | | | 1.35 | |
| 499. | 25.82 | | 25.82 | | | | |
| 500. | 28.84 | | | | 28.84 | | |
| Total | 7537.21 | 1072.90 | 474.55 | 2211.83 | 659.19 | 2046.09 | 1072.65 |

FIG. 8

| | | | CARD-1 | CARD-2 | CARD-3 | |
|---|---|---|---|---|---|---|
| Card Charges | | | 1,574.55 | 2,834.19 | 3,047.65 | |
| Merchant Claims -- Fee 1 | | | -1,072.90 | -2,211.83 | -2,046.09 | |
| Merchant Claims -- Fee 2 | | | -474.55 | -659.19 | -1,072.65 | |
| E-cash Adjustment | | | -27.10 | 36.83 | 71.09 | 80.83 |

FIG. 9

PROCESSING SYSTEM AND METHOD FOR A HETEROGENEOUS ELECTRONIC CASH ENVIRONMENT

FIELD AND BACKGROUND OF THE INVENTION

The present invention relates to a smart card payment system, and in particular, to a stored-value payment system, such as for retail sales.

Charge Transactions, Charge Functions, and Payment Cards

A "charge transaction" is a payment by an instrument such as a debit card or credit card, herein collectively referred to as a "charge card". A merchant receiving payment via a charge card transfers the customer's charge for settlement to the card issuer, either directly or indirectly via an acquirer or a transaction processing agency. The term "charge function" herein denotes any facility, such as a credit or debit scheme, by which a customer may initiate a charge transaction. A conventional charge card, for example, contains a charge function. The payment cards according to the present invention contain at least one charge function. The term "acquirer" herein denotes a commercial entity which provides charge card acceptance and settlement for merchants. Acquirers include, but are not limited to banks and similar financial institutions. Charge transactions are associated with published fees, settlement terms, benefits and incentives, involving customers, issuers, acquirers, transaction processors, communication providers, and other parties participating in the transaction or facilitating its completion. The term "issuer" herein denotes any commercial entity which issues charge functions to customers, or, in the case where a payment card contains a single charge function, a commercial entity which issues payment cards to customers. Issuers include, but are not limited to banks and similar financial institutions. A particular bank may function both as an issuer and as an acquirer, but different divisions of the bank are typically involved with these separate functions. The charge transaction market is highly competitive, with a number of issuers offering various and varying fee and incentive schemes to customers, and a number of acquirers seeking accounts with merchants. The customer decides which charge card(s) to carry and use, and the merchant decides which charge card(s) to accept.

Electronic Cash

"Electronic cash" is portable electronic money, stored in stored-value devices and transferred among them for payment and settlement. The principal justification for electronic cash is in making convenient cost-effective customer payments for small purchases, for which charge transactions are too expensive to handle because of fixed, per-transaction costs of authorization and settlement. The term "settlement" herein denotes the process of redeeming proprietary payment instruments for conventional monetary payment. Such proprietary payment instruments include, but are not limited to, charge slips and electronic cash. The term "conventional monetary payment" herein denotes payment made by monetary instruments not including charge transactions and electronic cash. Conventional monetary payment includes, but is not limited to, checks, bank drafts, conventional cash, wire transfers (which herein are not considered electronic cash). An example of settlement is that of a merchant sending charge slips from charge transactions to an acquirer, and then receiving a check which he may deposit in his bank account. The term "merchant" herein denotes any business entity which offers goods and/or services to the customer and receives payment therefrom.

Brands and Branding

The term "brand" herein denotes the individual proprietary identification of specific proprietary payment instruments, charge functions, and so on, issued by a commercial entity, and the term "branding" herein denotes the applying of a brand to any such specific proprietary payment instruments, charge functions, and so on. Brands are typically used as means of commercially identifying these respective different proprietary payment instruments in order that customers may readily distinguish between them. In conventional systems as well as in the system according to the present invention, charge functions are identified by their respective brands.

Within the scope of the present invention, it is charge functions which have brands. A single commercial entity may own and administer several different brands of charge function. For example, a particular financial institution may offer customers both a credit card and a debit card, which are herein considered as two distinct brands of charge function, even though they are offered by, and identified with, the same financial institution.

Note that while the charge function is commonly associated by the customer with a physical charge card, the charge function itself is actually associated with an account at the financial institution. The physical charge card is an instrument whereby the customer and a merchant may conveniently access that account. The physical charge card is not actually necessary for all accesses, as can be seen when a customer performs a charge transaction by verbally giving the account number to a merchant over the telephone. Consequently, although the brand is technically an attribute of the charge function, rather than the card, customers tend to associate the brand with the card itself. Accordingly, in the examples herein, the brand will be treated as belonging to the charge function, but brands will sometimes be labeled for exemplary purposes in terms of cards.

As another example of distinct branding, a financial institution may offer customers two different types of credit card. One such credit card type might be for "regular" customers, while the other might be for "preferred" customers and have different usage terms. Such two different credit cards are herein also considered to be two distinct brands of charge function, even though they are offered by, and generally identified with, the same financial institution. Note, however, that the importance of brands is in the competitive marketplace, in terms of customer perception and preference. What constitutes a brand of charge function (what distinguishes one charge function brand from another) is therefore determined arbitrarily by the commercial entity that creates and/or administers the charge function brand. It is possible for two distinct charge function brands to differ only in their names or identification, but otherwise have precisely identical features such as fees, loading terms, settlement terms, and so on. Consequently, the system according to the present invention does not impose any individuality requirements on charge function brands, but rather accepts whatever charge function brands are created and administered, and it is a goal of the present invention to maintain the distinct identities of all charge function brands. To be compatible with the system according to the present invention, however, charge function brands must establish loading terms and settlement terms as defined herein.

In the system according to the present invention, every charge function has a specific brand. A payment card with a single charge function may therefore be informally associated with that charge function. It is important to keep in mind, however, that it is the charge function, not the payment card, which actually has the brand. In the system according to the present invention, a single payment card may have more than one charge function and may therefore be associated with more than one brand.

Settlement and Settlement Terms

The term "settlement terms" herein denotes the specific conditions, provisions, stipulations, and fees relating to the process by which a merchant completes the accounting and monetary reconciliation of a charge transaction. Settlement of charge transactions by merchants generally involves settlement fees paid to the acquirer. Settlement terms may vary according to the charge function brand associated with the charge transaction.

Stored-Value Devices

The term "stored-value device" herein denotes any device or apparatus which is able to receive, store, and transfer electronic cash. A typical electronic cash payment system includes a variety of stored-value devices:

Customer stored-value devices such as smart card-based electronic purses, or protected stored-value memories in personal computers, cellular telephones, toll-payment transponders, etc. In the system according to the present invention, a payment card contains at least one electronic purse, which serves as a stored-value device.

Merchant stored-value devices, such as an electronic cash drawer of an automatic or manual "point of sale" (POS), and are used to collect and accumulate electronic cash received from customer stored-value devices and transfer this electronic cash for settlement to issuer stored-value devices.

Issuer stored-value devices such as an electronic cash pool, maintained at an issuer computer to issue, collect, and monitor electronic cash.

Loading Terms and Usage Terms for Electronic Cash

In a conventional electronic cash scheme, electronic cash is purchased at a loading terminal against cash or debit-card payment. This electronic cash is loaded into the customer's stored-value device. When the customer makes a purchase, payment is made by transferring electronic cash from the customer's stored-value device to the merchant's stored-value device. The cash accumulated in the merchant's stored-value device is transferred back to the issuer stored-value device for settlement. The term "loading terms" herein denotes the specific conditions, provisions, stipulations, and fees relating to the process by which a customer obtains electronic cash in the electronic purse of a payment card. Loading terms are associated with the brand of the charge function against which the value of the loaded electronic cash is paid. Loading of electronic cash by customers generally involves transaction fees paid to the card issuer. The term "usage terms" herein denotes the specific conditions, provisions, stipulations, and fees relating to the process by which a customer obtains a specific payment card and subsequently obtains goods and services through the use of that payment card, including the use of any charge functions and electronic cash on that payment card.

Heterogeneous and Homogeneous Payment Schemes

The term "heterogeneous" herein refers to payment instruments for use in a commercial environment, for which various payment, fee, and incentive schemes cooperate or coexist. Charge card payment is generally heterogeneous, since there are a variety of different charge cards simultaneously available for use by customers and merchants. For example, a merchant may choose to accept three different charge cards, and notify customers by appropriate signs that these are accepted by him; a customer visiting this merchant and having one or more of the accepted cards, may choose which card to use for making payment. In contrast, the term "homogeneous" herein refers to payment instruments for use in a commercial environment, for which a single payment, fee, and incentive scheme exists. Conventional cash is homogeneous.

As described above, electronic cash also tends to be homogeneous, since the very essence of electronic cash is conceived by many as an alternative form of conventional cash. Therefore, electronic cash is usually issued only against payment with either conventional cash or directly from a bank account via a debit card, and the merchant fee is expected to be uniform to all issuers and very small, since for conventional cash there is no fee at all. This reality prevents competition and suppresses entrepreneurial initiatives, because there is no obvious way for banks and other financial institutions to realize a suitable profit solely by offering an electronic cash system to consumers. That is, the business case for electronic cash is unclear, especially in a highly-competitive, fragmented business environment such as the United States of America.

An Alternative Electronic Cash System

An alternative electronic cash and charge card system is described in U.S. Pat. No. 5,744,787 by the present inventor (PCT publication WO 96/09562), which is incorporated by reference as if set forth fully herein. In this alternative system, smart cards bearing both a charge function and an electronic cash purse are used to pay at improved automatic or manual points of sale, according to the following method (for demonstration, it is assumed that the smart card is allowed to use the charge function or transactions above $25, and that the smart card purse currently stores $10 of electronic cash):

1. if the payment is for an amount of $25 or more, payment is made via the charge function (e.g. credit or debit);
2. if the payment is for an amount smaller than $10 (current stored value), payment is made from the stored value in the smart card purse;
3. if the payment is for any amount smaller than $25 but larger than $10, then:
   (a) $25 is charged via the charge card, and,
   (b) change of $25 less the payment amount is returned, in the form of electronic cash, from the POS stored-value device to the customer stored-value device.

It is shown in U.S. Pat. No. 5,744,787 that statistically, in a POS serving a large number of customers, the amount of electronic cash flowing into the POS as a result of transactions of type 2. equals in average the amount of electronic cash flowing out of the POS as a result of transactions of type 3. Therefore, priming the POS with a moderate amount of electronic cash, ensures uninterrupted operation without need for replenishing the electronic cash in the POS for the purposes of making change.

Limitations of Prior Art Electronic Cash Schemes

A serious limitation of the prior art schemes for electronic cash is that electronic cash as currently defined is not in harmony with the existing banking-oriented account-based financial infrastructure, in which charge transactions figure prominently, and in which there are a variety of different, competing, charge function brands.

First of all, electronic cash according to prior art implementations is seen by customers and merchants alike principally as a convenient replacement for conventional cash and therefore there is considerable resistance to associating electronic cash with usage fees of any kind (except perhaps with only minimal usage fees). As a result, financial institutions currently have little incentive to offer electronic cash systems to merchants and customers. At present, therefore, electronic cash can be acquired only via conventional cash or by direct account debit, where overhead is minimal.

Moreover, even if electronic cash could be associated with meaningful fees, electronic cash must remain generic (i.e., brandless, just like conventional cash), so a common pool of prior art electronic cash would not work with different branded charge functions and their diverse fee structures. Some prior art payment cards allow a customer to reload the electronic purse at a loading device by conducting a debit charge transaction using a debit charge function on the payment card. However, as just noted, such payment cards cannot work with different brands of charge function, and are not available for reloading via a credit charge transaction. Prior art electronic cash acquired through different charge functions cannot be allowed to mix, because doing so would confuse the fees associated with the electronic cash. Avoiding this problem in prior art electronic cash systems would require a variety of different brands of electronic cash to match the different brands of the charge functions used by customers to acquire the electronic cash. But different brands of electronic cash would lead not only to confusion in the minds of customers and merchants, but would also present an impenetrable barrier to the interoperability of electronic cash among the different account-based charge functions in the marketplace. Without smooth interoperability, it is unlikely that electronic cash can achieve commercial success. Because of the low costs and fees associated with prior art electronic cash, it would require a huge critical mass of customers and merchants to sustain viable performance, and this necessary critical mass cannot be attained if the electronic cash infrastructure would be fragmented by a variety of incompatible brands of prior art electronic cash.

In effect then, the problem with prior art electronic cash systems is that in order to be practical electronic cash must remain brandless, while it is essential to preserve the brand identities of charge functions with which the electronic cash interacts. This leads to a major incompatibility of prior art electronic cash with the existing account-based charge functions that currently dominate the financial infrastructure.

These limitations of the prior art are overcome by the present invention.

OBJECT AND BRIEF SUMMARY OF THE INVENTION

The object of the present invention is to provide a heterogeneous electronic cash system, wherein electronic cash can be acquired against a variety of charge function brands, under a variety of fee and incentive schemes relating to loading and settlement. It is aimed at encouraging competition in multi-issuer environments and allowing the usage of credit cards, debit cards and cash to purchase electronic cash for use in a unified clearance and settlement environment. A key goal of the present invention is to allow a common generic electronic cash to function simultaneously across a variety of distinct charge function schemes, such that different charge functions can act as acquisition instruments for the same electronic cash. These different charge functions incorporated into different or shared payment cards can share a common stored value pool without conflict, and can make use of a common infrastructure for settlement of the electronic cash. That is, the present invention provides diverse charge functions with interoperability. The present invention, however, permits the electronic cash to maintain a connection with the brand of acquisition instrument (the charge function) used by the customer to acquire the electronic cash, throughout the complete cycle from acquisition through settlement. In this way, the different charge function schemes may interoperate with electronic cash in the same commercial arena while preserving their own individual identities and fee structures.

In the system according to the present invention, generic (brandless) electronic cash can be acquired by a customer through a specific, branded charge function, such as with a familiar credit card or debit card. The electronic cash remains generic, but is associated for purposes of spending and settlement with the specific brand of charge function through which the electronic cash was acquired by the customer, starting from the time of loading onto the customer's payment card, through the time of use to purchase goods or services at a merchant's point of sale, and through the time of presentation for settlement by the merchant to a transaction processing agency or financial institution. This offers commercial benefits by allowing independent charge payment plans ("charge functions") to take advantage of a common electronic cash while maintaining separate transaction accounting in order to implement different fee structures, settlement terms, customer brand identities, and so forth. The use of a generic electronic cash lowers operating costs by allowing different brands of charge function to use a single financial infrastructure, and also simplifies payment transaction procedures at a merchant's point of sale, thereby reducing overhead. The present invention furthermore permits these advantages to be realized with minimal change to the existing charge payment systems and their infrastructure.

The basis of the present invention is in conceiving each electronic cash ransaction as a fraction of a parent transaction which has been executed to acquire this electronic cash. Thus, for example, if a certain credit charge function identified by the brand "Brand A" has been used to acquire $25 of electronic cash (the "parent transaction"), payment of $1 of this electronic cash (a "child transaction") will be considered as paying 1/25 of the parent transaction and will therefore be considered as a "Brand A" transaction. Furthermore, child transactions relating to the same parent transaction brand can optionally be combined to determine the related fees and incentives ("settlement terms"); for example, a merchant collecting a total of $200 electronic cash from various customers who have used the "Brand A" charge function to purchase electronic cash, would submit this $200 for settlement with an acquirer under the settlement terms relating to $200 settlement of the credit charge function "Brand A", rather than as a group of the individual transactions. This illustrates the principle that a charge transaction used to acquire electronic cash is broken into smaller pieces of electronic cash to allow a charge function to be cost-effective in making small purchases, and then these small pieces, quantified by the electronic cash, can be consolidated into larger units for cost-effective settlement.

Another aspect of the present invention relates to the integrity and accounting of the system. In order to avoid uncontrolled intermixing of electronic cash in a way which will interfere with the identification of the parent transaction, two alternative approaches are presented:

1. isolated flow, wherein the flow of electronic cash is restricted: Electronic cash is allowed to flow into electronic purses on payment cards only from bank computers and only against payment via a charge function. Electronic cash is allowed to flow out of electronic purses on payment cards only to points of sale. And electronic cash is allowed to flow from points of sale only to settlement systems. Optionally, card-to-card transfer may be also allowed among payment cards supporting the same brand of charge function. The transfer of electronic cash associated with one brand of charge function is not permitted to flow into to a payment card which does not support that brand.

2. zero average flow, wherein electronic cash circulates between electronic purses and points of sale and between points of sale and bank computers, within the framework of the above-mentioned previous invention of the present inventor, described in U.S. Pat. No. 5,744,787.

Payment Cards, Points of Sale Loading Devices, and Settlement Systems

The term "payment card" or "card" will be used hereinafter relating mostly to any payment instrument personal to a customer and including both at least one charge function (identifying and authorizing transactions with a remotely chargeable account of a customer, such as a bank account or credit account) and at least one stored-value function ("electronic purse"). Each charge function of a payment card is associated with a brand identifiable via a machine-readable code (i.e., a charge function brand can be read automatically by a device such as a point of sale without the need for manual input). A payment card can be implemented in the form of a plastic, credit-card-sized card; on a personal computer; in a cellular telephone; in a control box of a TV set; etc.

In addition, a payment card according to the present invention contains at least one electronic purse for holding electronic cash. The electronic cash itself is brandless, but the electronic purse contains a contents brand ID register which associates the electronic cash contained in the electronic purse with a specific charge function brand. In one embodiment of the present invention, the contents brand ID register of an electronic purse is permanently associated with a predetermined brand (for example, a simple brand identifier), so that any electronic cash loaded into the electronic purse will thereby become associated with the corresponding charge function brand. In another embodiment of the present invention, the brand associated with the contents brand ID register of an electronic purse may be changed, so that the charge function brand associated with the electronic cash contained in the electronic purse can be altered or updated as necessary.

The term "point of sale" here denotes any device that can interface with a payment card via a contact, contactless or remote communication link. Upon so interfacing, a point of sale can accept payment from a payment card, activate a charge function, transfer electronic cash, and so forth. A point of sale accumulates received electronic cash in an included secure storage device ("electronic cash drawer"), and may also accumulate charge transactions done off-line in another included storage device ("electronic safe".)

The term "loading device" herein denotes any device which can add electronic cash to an electronic purse of a payment card, against a charge function under "loading terms" (e.g., loading transaction fees) specific to the charge function brand. The term "settlement system" herein denotes any device or system operated by an acquirer, a card issuer, or a transaction processing agency, to communicate, directly or indirectly, with points of sale for transferring charge orders and electronic cash for settlement. Examples of settlement systems include, but are not limited to computers, computer systems, and computer networks, including prior art devices and systems of this sort.

Brandless Electronic Cash

In the system according to the present invention, electronic cash itself never has any brand. Brands are an attribute of charge functions only. However, electronic cash, when stored in an electronic purse of a payment card or in an electronic cash drawer of a POS, is associated with the specific brand of charge function by which the electronic cash was acquired. This temporary association is maintained for the electronic cash throughout all transactions and in all stored-value devices in which the electronic cash is stored until the electronic cash ultimately returns to the original issuing financial institution. At this point the electronic cash is returned to a common pool and is dissociated from the brand. When later reissued by a financial institution, the electronic cash becomes again associated with whatever particular brand of charge function was used by the customer to make the most recent acquisition.

As noted previously for electronic purses, other stored-value devices which hold electronic cash (e.g., electronic cash drawers) may be temporarily or permanently associated with a brand. Embodiments of the present invention illustrate both permanent and temporary association of a stored-value device with a brand.

Therefore, according to a preferred embodiment of the present invention, there is provided a heterogeneous electronic cash payment system having at least two different brands of charge function, each brand having loading terms and settlement terms, the heterogeneous electronic cash payment system including: (a) a plurality of payment cards, each payment card belonging to a customer, each payment card having at least one charge function to a remotely chargeable account of the customer, and at least one electronic purse operative to containing electronic cash and having a contents brand ID register for associating a charge function brand with the electronic cash; (b) at least one loading device operative to interfacing with a specified payment card, adding electronic cash to the electronic purse of the specified payment card against payment from a selected charge function according to the loading terms of the brand of the selected charge function; (c) at least one point of sale having a transaction record and an electronic cash drawer for storing electronic cash, the point of sale operative to interfacing with a presented payment card of the plurality of payment cards, receiving an electronic cash payment from the presented payment card, reading the brand of a predetermined charge function of the presented payment card, depositing the electronic cash payment in the electronic cash drawer, and recording the electronic cash payment along with the brand of a predetermined charge function onto the transaction record; and (d) a settlement system operative to settling electronic cash payments according to the settlement terms of the brands of charge functions associated with the electronic cash payments.

Also, according to another embodiment of the present invention there is provided a system as described above, wherein at least one of the loading devices is contained within an enhanced point of sale, the enhanced point of sale being operative, upon interfacing with a presented payment card chosen for paying a payment sum according to a specified charge function selected from the at least one charge function, the loading terms stipulating a predetermined reload sum, to automatically determine whether to: (i) charge the predetermined reload sum to the specified charge function; (ii) return to the electronic purse of the payment card as change an amount of electronic cash equal to the difference between the predetermined reload sum and the payment sum; and (iii) record the payment sum and the brand of the specified charge function onto the transaction record.

Moreover, according to the present invention there is provided a system as described above, wherein the settlement system comprises: (i) a merchant computer owned by a merchant operative to collecting and submitting charge slips, transaction records, and electronic cash; (ii) a settlement network operative to receiving charge lips and issuing conventional monetary payment therefor; (iii) an electronic cash pool operative to storing electronic cash and exchanging electronic cash for conventional monetary payment; and (iv) an acquirer computer operative to receiving charge slips and electronic cash; making conventional monetary payment to the merchant; exchanging electronic cash with the electronic cash pool for conventional monetary payment; and submitting charge slips to the settlement network in exchange for conventional monetary payment.

According to the present invention there is also provided a method for managing a heterogeneous electronic cash environment, the environment having a plurality of charge function brands, each brand having loading terms and settlement terms, the environment further having a plurality of payment cards, each payment card having an electronic purse and a contents brand ID register, the environment further having at least one loading device and at least one point of sale with an electronic cash drawer and a transaction record, the environment further having a settlement system, the method including the steps of: (a) interfacing a selected payment card to a loading device, initiating a charge transaction with a charge function of the selected payment card, transferring electronic cash into the electronic purse of the selected payment card according to the loading terms for the brand of the charge function, and setting the contents brand ID register of the selected payment card to the brand of the charge function; (b) interfacing a presented payment card to a specified point of sale, transferring an electronic cash payment from the electronic purse of the presented payment card to the electronic cash drawer of the specified point of sale, and recording the brand set in the contents brand ID register of the presented payment card onto the transaction record of the specified point of sale; and (c) settling the electronic cash payment through the settlement system according to the settlement terms of the brand recorded onto the transaction record.

Furthermore according to the present invention there is additionally provided a method for associating a new charge function brand with electronic cash returned as change from a purchase transaction to a multiple charge function payment card having a single electronic purse, the purchase transaction having a sum and being made via the new charge function brand, the single electronic purse containing a balance of electronic cash associated with a previous charge function brand, the single electronic purse having a contents brand ID register indicating the charge function associated with the electronic cash contained in the single electronic purse, the method including the steps of: (a) paying the balance of electronic cash in the single electronic purse toward the sum of the purchase transaction, the payment being associated with the previous charge function brand; (b) charging a predetermined minimum charge transaction amount to the new charge function brand; (c) returning, as change, an amount of electronic cash to the electronic purse equal to the predetermined minimum charge transaction amount plus the balance less the sum of the purchase transaction; and (d) setting the contents brand ID register to indicate the new charge function brand.

BRIEF DESCRIPTION OF THE DRAWINGS

The invention is herein described, by way of example only, with reference to the accompanying drawings, wherein:

FIG. 3 shows the contents of a log file for transactions in a heterogeneous environment involving isolated flow.

FIG. 7 shows the transactions of a point of sale in the environment of FIG. 4, FIG. 5, and FIG. 6, involving zero average flow.

FIG. 8 shows a log file corresponding to the transactions shown in FIG. 7 in a heterogeneous environment involving zero average flow.

FIG. 9 shows the settlement for the transactions of FIG. 7 and FIG. 8.

Figure 1:
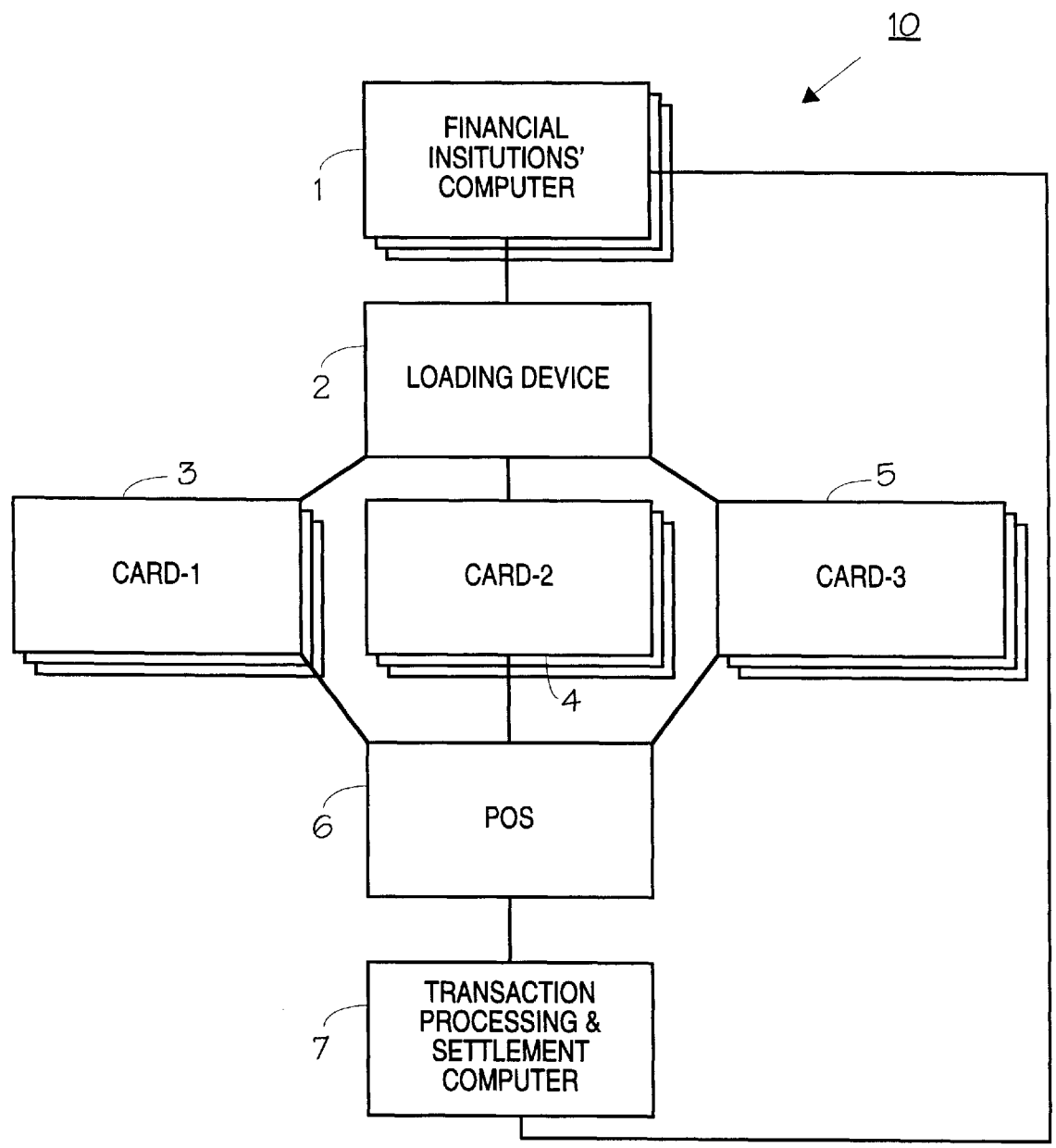
FIG. 1 shows several different brands of payment cards in a heterogeneous environment involving isolated flow.

Note: for brevity in the drawings and descriptions, electronic cash is sometimes denoted as "e-cash", an electronic purse is sometimes denoted as a "purse", and a payment card is sometimes denoted as a "card".

DESCRIPTION OF THE PREFERRED EMBODIMENTS

FIG. 1 describes a first preferred embodiment, of the case involving isolated flow, with three groups 3, 4, 5 of different payment cards having different charge function brands denoted as "Card-1", "Card-2" and "Card-3" (in this embodiment, a payment card has a single charge function, so that the charge function brand can be associated with the payment card as well as with the charge function). A payment card interfaces with a loading device 2 to add value from the respective account in a financial institution computer 1. Payment is made with a payment card in a POS 6, and POS 6 communicates with a transaction processing and a settlement computer 7, which further communicates with computer 1, to process and settle the transactions which have been made via the charge functions and electronic purses of the payment cards. It will be recalled that in isolated flow, electronic cash moves within the system only from payment cards 3, 4, and 5 to POS 6 and then to settlement system 7. There is no local circulation of the electronic cash, only a global circulation via financial institution computer 1. Because of this it is relatively easy to keep the different flows of electronic cash corresponding to different charge function brands separate as the electronic cash flows.

Figure 1A:
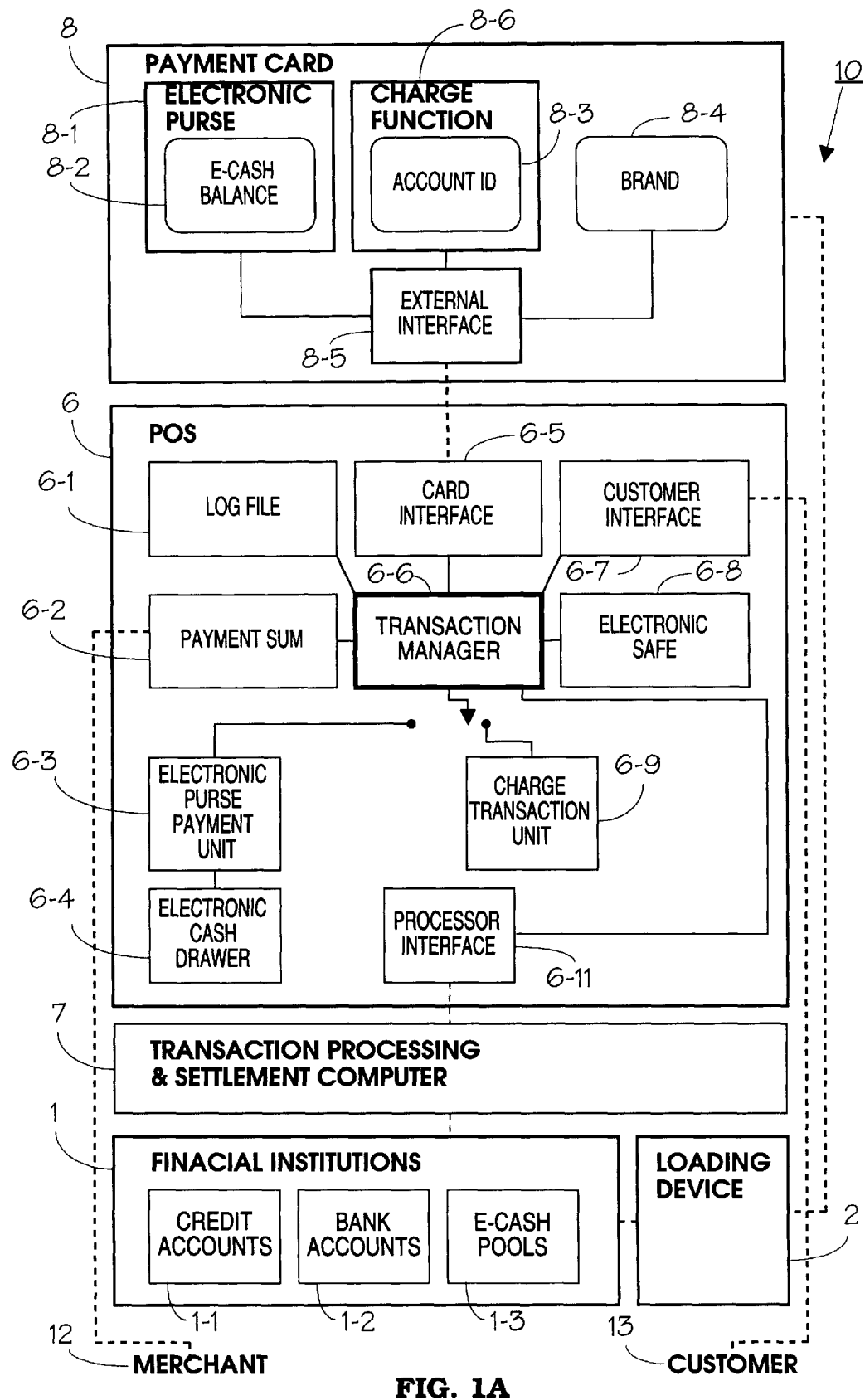
FIG. 1A shows a detailed view of a heterogeneous card environment involving isolated flow.

FIG. 1A is a more detailed description of the system of FIG. 1. A payment card 8 corresponds to any of cards 3, 4, or 5 (FIG. 1). Payment card 8 contains an electronic purse 8-1 having an electronic cash balance in a register 8-2, and also contains a charge function 8-6 associated with an account ID 8-3. There is a brand identifier 8-4, which serves to identify the charge function brand of payment card 8 through an external interface 8-5, which also handles all communication of payment card 8 with points of sale as well as a loading device 2. In this embodiment, brand identifier 8-4 serves as the contents brand ID register for electronic purse 8-1. A POS 6 contains a card interface 6-5 to communicate with payment cards as well as a customer interface 6-7 to communicate with a customer 13, and a processor interface 6-11 to communicate with a settlement system 7, which in turn communicates with financial institutions 1. Within POS 6, there is a transaction manager 6-6, which determines the appropriate means of handling the current transaction. If the purchase amount exceeds a predetermined minimum charge transaction amount (for example, $25), transaction manager 6-6 initiates a charge transaction from charge function 8-6 for account ID 8-3 of payment card 8, and handles this charge via a charge transaction unit 6-9. If the purchase is less than the predetermined minimum charge transaction amount and there is sufficient electronic cash for payment sum 6-2 (input by merchant 12), transaction manager 6-6 receives payment in electronic cash from electronic purse 8-1 and puts this electronic cash in an electronic cash drawer 6-4, handling this transaction by an electronic purse payment unit 6-3. Otherwise, if the purchase is less than the predetermined minimum charge transaction amount but there is not sufficient electronic cash for the purchase amount, transaction manager 6-6 declines the transaction. Note that POS 6 maintains an internal log file 6-1, listing all transactions, and has an electronic safe 6-8 for off-line charge transactions. In this example and in further following examples, a log file is a special case of a more general transaction record. In the general case, a "transaction record" is any record of the transactions maintained by a device (such as a point of sale), including, but not limited to a sequential data file such as a log file, or a cumulative register containing a net total amount of the applicable transactions. Depending on the nature of a transaction record, the recording of a payment onto the transaction record can involve operations including, but not limited to, writing data into a sequential data file, and updating a cumulative register. Financial institutions 1 has a set of credit accounts 1-1, bank accounts 1-2, and electronic cash pools 1-3, which store electronic cash that is not in circulation. Electronic cash from electronic cash pools 1-3 flows into loading device 2 for reloading payment card 8.

When loading payment card 8 at loading device 2, the value of electronic cash deposited into electronic purse 8-1 is charged to a charge function. Normally, this charge function will be the same charge function 8-6 with the same account ID 8-3 that is contained with payment card 8, but it is also possible to use a different payment card with a different account ID, provided that the different payment card has the same brand of charge function as the payment card that is being loaded.

In the examples which follow, the predetermined minimum charge transaction amount is illustrated as being $25. Different amounts are possible.

Figure 2:
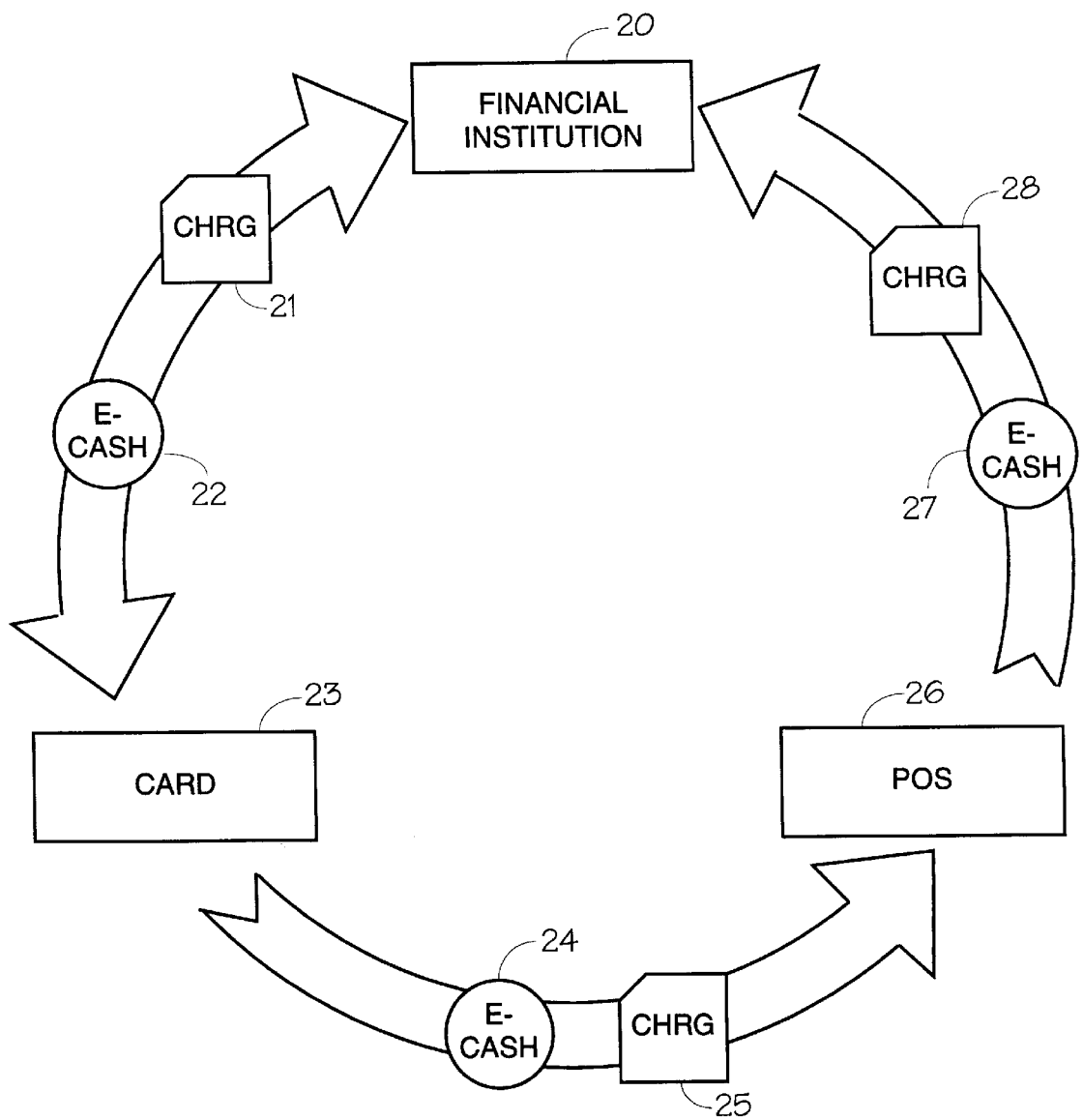
FIG. 2 shows the transaction flow of electronic cash and charges involving isolated flow.

FIG. 2 describes the transaction flow within the system of FIG. 1 and FIG. 1A. A charge payment 21 at a financial institution 20 is used at a loading device 2 to load electronic cash 22 into a card 23. Card 23 then pays at a POS 26 with electronic cash 24 or charge 25. POS 26 communicates with transaction processing and settlement computer 7 to settle with financial institution 20 its electronic cash 27 and charges 28.

FIG. 3 describes the contents of log file 6-1 of FIG. 1A, which is submitted by POS 26 to financial institution 20 for accounting and fee calculation. FIG. 3 shows 20 out of 500 sale transactions, whose values (column 32) are either <$25 (an example of a predetermined minimum charge transaction amount; purchase sums less than this are small transactions paid by electronic cash), or ≧$25 (larger payments made by the charge function). Then, columns 33–38 present the transactions according to the charge function brand used and the transaction value (fee-1 relates to transactions <$25 and fee-2 relates to higher values). At the bottom of FIG. 3, in a Total row 31, the numbers (including those from transactions #11 through #490 which are not shown) are added, thus allowing the merchant to claim reimbursement from three different charge function brands, potentially under different fee schemes, and even separating, for each charge function brand, between fees for smaller and higher payments.

It would be noticed that, for preserving the integrity of the described embodiment, electronic cash is not allowed to be transferred between cards having charge functions of different brands, and electronic cash is allowed to move from points of sale only toward settlement computer 7 of FIG. 1 and FIG. 1A.

Figure 4:
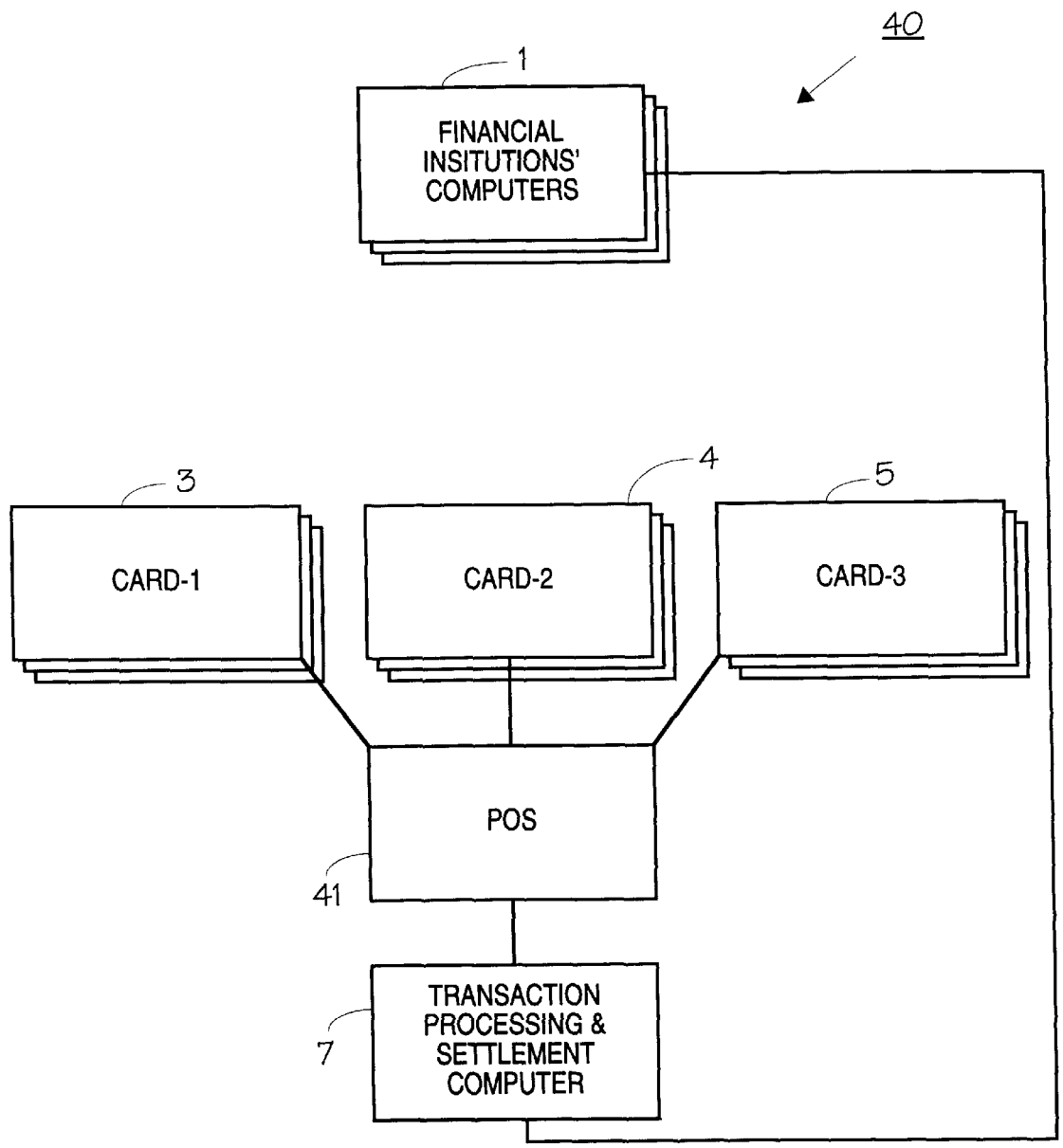
FIG. 4 shows a heterogeneous environment which returns electronic cash as change and requires no separate reloading terminals, involving zero average flow.

FIG. 4 describes an alternative embodiment of the present invention, relating to U.S. Pat. No. 5,744,787. Here the three charge function brands 3, 4 and 5 are communicating with a POS 41 under the procedure of FIG. 5, and there is no need for separate loading devices, because POS 41 is an enhanced POS which contains a loading device.

Figure 4A:
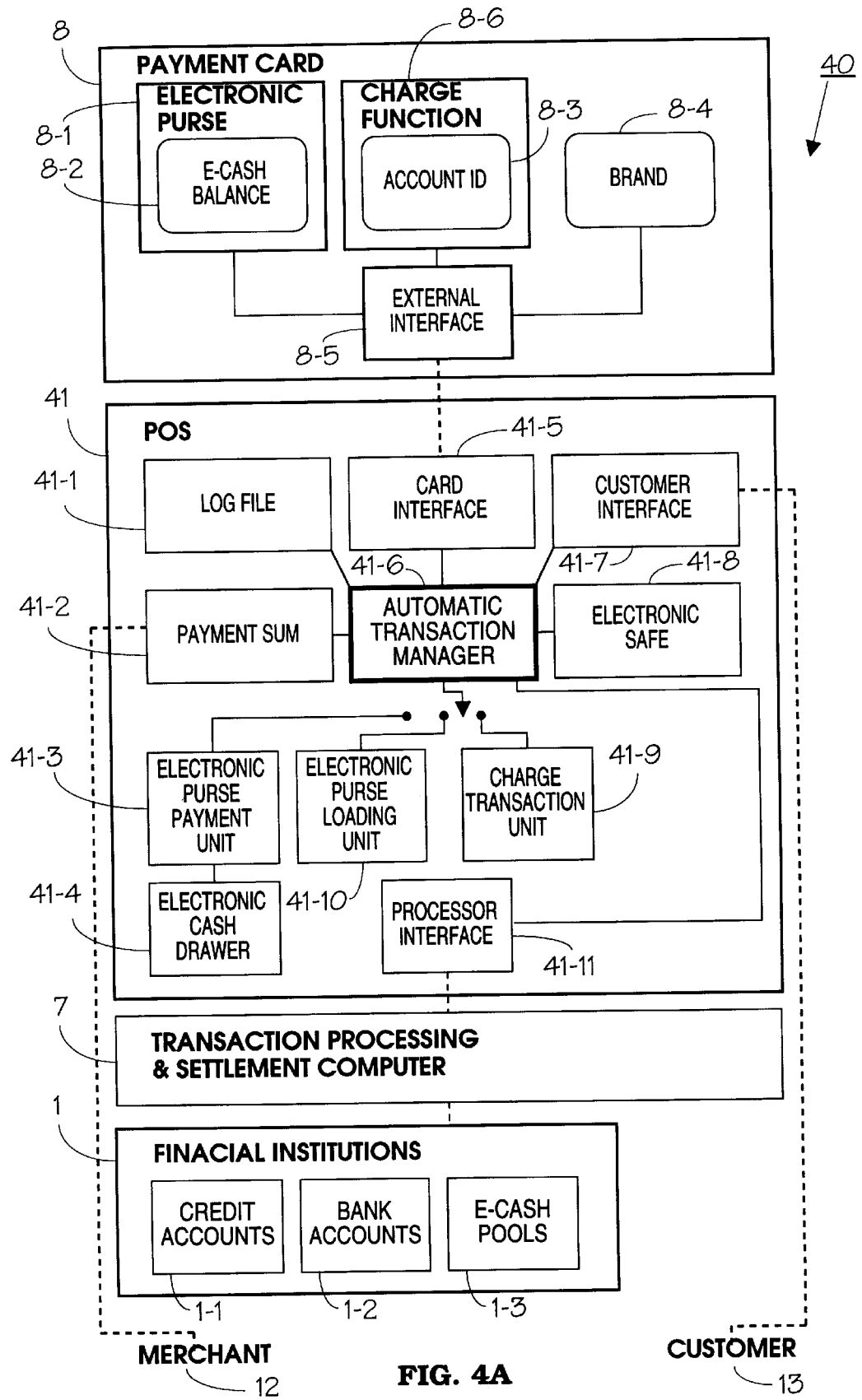
FIG. 4A shows a detailed view of the heterogeneous environment which returns change and requires no separate reloading terminals, involving zero average flow.

FIG. 4A is a detailed description of the embodiment of FIG. 4. In many regards, the system is similar to that illustrated in FIG. 1A, except as noted here. For example, financial institution 1, settlement system 7, and payment card 8 of FIG. 4A are identical to those of FIG. 1A. Loading device 2 of FIG. 1 and FIG. 1A is absent from FIG. 4 and FIG. 4A, because the system of FIG. 4 and FIG. 4A requires no loading device; reloading of payment card 8 is accomplished by the local circulation of electronic cash from POS 41 to payment cards 3, 4, and 5 (FIG. 4) or payment card 8 (FIG. 4A). POS 41 contains many elements which correspond to POS 6 of FIG. 1A, but there are some differences. In particular, an automatic transaction manager 41-6 operates according to the procedure of FIG. 5 and has an additional function over that of FIG. 1A, an electronic purse loading unit 41-10. It is electronic purse loading unit 41-10 which performs the function of loading device 2 in FIG. 1A.

Figure 5:
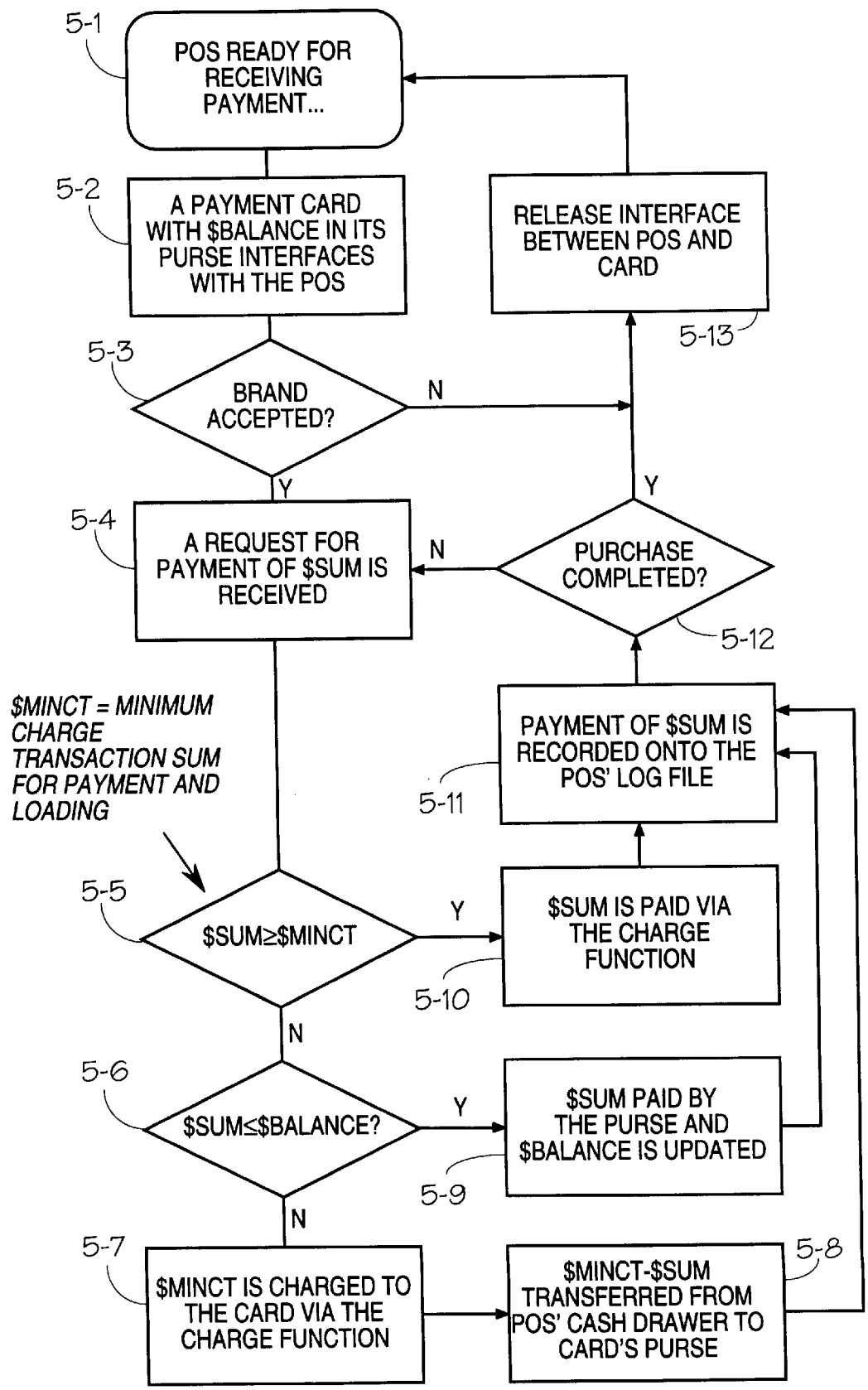
FIG. 5 is a flowchart showing the operation of an automatic change manager for zero average flow.

FIG. 5 describes the operation of automatic transaction manager 41-6 of FIG. 4A. Upon presentation of a payment card, the automatic transaction manager checks at a decision point 5-3 whether to accept or reject the payment card based on the payment card's charge function brand. FIG. 5 also shows how POS 41 automatically selects how payment is to be made by the payment card. In making the selection, automatic transaction manager 41-6 compares the payment sum ($SUM) against a predetermined minimum charge transaction amount ($MINCT). This predetermined minimum charge transaction amount is taken as a predetermined reload sum, upon which is based the amount of electronic cash that will be returned as change to reload the payment card. In the examples which follow, $MFNCT and the predetermined reload sum are $25. Automatic transaction manager 41-6 selects whether to charge the payment sum to the charge function of the payment card, take the payment sum from the electronic cash stored in electronic purse 8-1, or whether to receive $25 via the charge function and return the change ($25 minus the payment sum) to the electronic purse. When the POS selects to return change to the payment card, electronic cash is taken from electronic cash drawer 41-4 of POS 41 (FIG. 4A).

The following statistical aspects are important:

After some time of usage, we can reasonably expect that any payment card will carry in its electronic purse a random amount of electronic cash, uniformly distributed in the range of 0 to $25 (an example of the predetermined minimum charge transaction amount). When using such a payment card to pay any small amount of $SUM<$25, there are two possibilities:

(a) If $SUM is larger than the current on-card electronic change purse balance (the probability of this situation is $SUM/$25), then an electronic change of $25−$SUM will be drawn from the POS and returned to the electronic purse of the card. Thus, $E_{change}$, the expected value of electronic cash returned as change from the POS to the payment card's electronic purse is:

$$E_{change} = \left(\frac{\$SUM}{\$25}\right) * (\$25 - \$SUM) \quad (1)$$

(b) If $SUM is equal to or smaller than the current random value stored in the payment card's electronic purse (the probability of this situation is $$1 - \frac{\$SUM}{\$25}),$$

then the amount $SUM will be deducted from the payment card's electronic purse and transferred to the POS; thus, $E_{payment}$, the expected value of electronic cash transferred in payment from a payment card to the POS is:

$$E_{payment} = \left(1 - \frac{\$SUM}{\$25}\right) * \$SUM \quad (2)$$

Basic algebra shows that the magnitude of $E_{change}$ in Equation (1) equals the magnitude of $E_{payment}$ in Equation (2). This means that for any POS, electronic cash flow from electronic purses to this POS during a regular business cycle equals on average the amount of electronic cash returned as change from the POS to payment cards. Thus secure, flawless, off-line operation is guaranteed.

Figure 6:
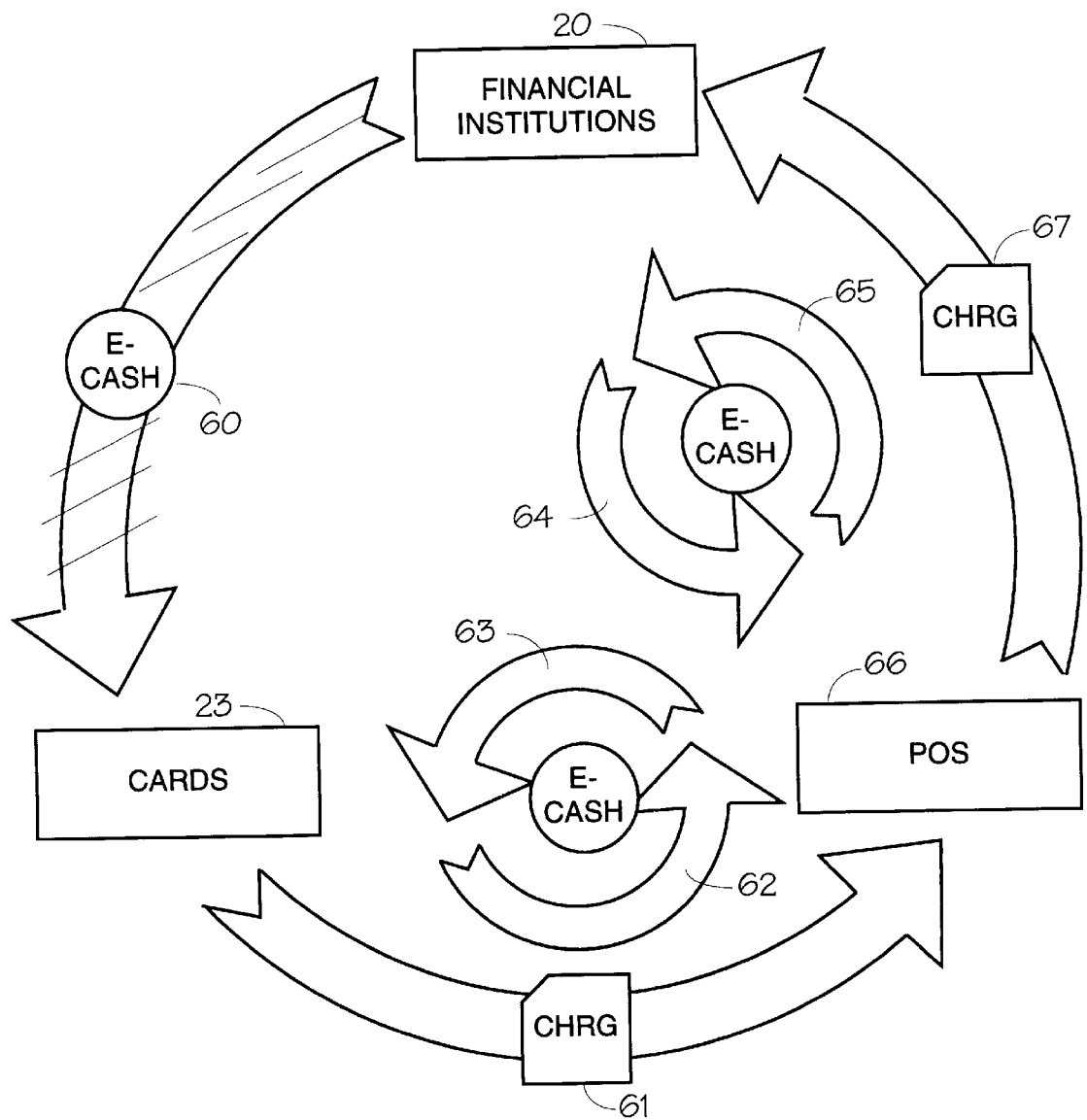
FIG. 6 shows the flow of electronic cash, change, and charges in the environment of FIG. 4 and FIG. 5, involving zero average flow.

FIG. 6 describes the flow of electronic cash and charges with the embodiment of FIG. 4 and FIG. 5. Electronic cash 60 is a one-time initial preload of a card 23 from financial institution 20. After this preload there are no more direct transactions between card 23 and financial institution 20. A charge 61 is made either for payments≧$25 (step 5-10 or step 5-7 in FIG. 5). An electronic cash payment 62 from cards to POS is made in step 5-9 (FIG. 5), while electronic cash is returned as change 63 via step 5-8 (FIG. 5). As explained above in Equation (1) and Equation (2), electronic cash amounts flowing via payment 62 and change return 63 are statistically equal, thus electronic cash is merely revolving between cards and POS, while the carrier of payment value from cards to POS is a charge transaction 61 alone (except for minor statistical fluctuations). Charges 67 are transferred from a POS 66 to financial institutions 20 via settlement computers, while electronic cash revolves, after initial priming through 64, through positive and negative adjustments 64 and 65 at the end of each business cycle, to refresh a priming amount predetermined for each POS according to the typical sizes and number of transactions. It would be appreciated that, in a 1 million card system, 25 million dollars (12.5 million on average in electronic purses, and 12.5 million in merchant and bank stored-value devices), revolving in cycles 62–63 and 64–65, will enable revenue flow 100 times larger per year (assuming each card is used for $200 purchases/month,) actually flowing through conventional charge transactions 61–67. Thus the very essence of electronic cash is redefined in this scheme: here electronic cash is a means of cost-effectively splitting relatively large conventional charge transactions into small pieces for micro-payments, rather than being a new and problematic monetary creature.

FIG. 7 describes the operation of a POS in the embodiment of FIG. 4 to FIG. 6 through 500 random transactions, out of which 20 are shown and 480 (#11 through #490) have been hidden because of the page space. The POS has been initially primed with $750, to compensate for statistical fluctuations. Column 71 shows purchase prices, selected randomly between 50¢ and $30, and made via three charge function brands shown in column 74. Columns 75 through 77 show charges, sorted out according to the respective charge function brand, to those transactions which are charge transactions. In sale #1, payment of $23.16 could not be made from a purse containing only $17.48, and therefore $25 has been charged to the Card-1 brand charge function, and $1.84 has been returned as change to the card's electronic purse.

The change has been deducted from the value in the POS electronic cash drawer (column 78) thus leaving there an amount of $748.16. Sale #2 has been deducted $7.39 (column 71) from a card's electronic purse and added to the electronic cash drawer of the POS (column 78), with no charge transactions (columns 75 through 77) being involved. Sale #8, being larger than $25, is made directly to the charge function, without the electronic purse being involved. At the bottom line we see the summary of the 500 transactions (including the hidden transactions #11 through #490); the total is $7537.21, which have been paid by $1574.55, $2834.19 and $3047.65 via charge function brands Card-1, Card-2 and Card-3, respectively, and by $80.83 of excessive electronic cash 79 in the electronic cash drawer (column 78), which started the business cycle with $750 and ended up with $830.83.

FIG. 8 shows the log file which the merchant sees as a result of the transactions of FIG. 7. The same payment sums of column 71 (FIG. 7) are shown in column 81. However, electronic cash transactions and automatic change are not shown at all. Each payment is categorized into one of columns 82 through 87, according to the respective card brand and the transaction size ("fee 1" for <$25 and "fee 2" for ≧$25.) Thus the merchant will now claim the bottom-line sums, under six different fee schemes. It is noted that the total sum submitted to each charge function brand (e.g., $1072.90+$474.55=$1547.45, see columns 82, 83) slightly deviate from the sums collected via the respective charge function brand ($1574.55, column 75 in FIG. 7).

FIG. 9 shows how the settlement computer completes accounting for the transactions of FIG. 7 and FIG. 8 (i.e., regarding a single POS). For example, when communicating with the computer of Card-1 brand, customer card charges 91 of $1,574.55 stand against merchant claims of $1072.90 and $474.55 on which merchant fees are to be paid according "fee 1" and "fee 2" fee schemes, respectively. However, as the total card charges 91 exceeds the total merchant claims 92 and 93 by $27.10, this sum is transferred, in electronic cash, from the computer of Card-1 brand to the settlement computer. It would be emphasized that commerce of over $1500, using conventional charge schemes and not explicitly involving any electronic cash, has been enabled by $27.10 technical adjustment using electronic cash. In the case of Card-2 and Card-3, the electronic cash adjustment is positive (i.e., electronic cash is transferred from the settlement system to the respective brand computer). As can be seen, the three adjustments of row 94 add-up to $80.83, which is exactly the excessive amount taken from the POS (column 78 of FIG. 7) to return the POS to the $750 baseline.

It would be appreciated that in the embodiment of FIG. 4 through FIG. 9, the entire notion of electronic cash is actually transparent to both the customer and the merchant. None of them is involved in handling electronic cash, and for both the electronic cash is merely an enabler to extend existing credit and debit services. Thus existing mindsets and fee schemes allow to adopt the operational and accounting scheme in a seamless, straightforward manner, to benefit customers, merchants, and bankers involved in card payment for small transactions.

A closer look at FIG. 6 through FIG. 9 shows the following:

1. The merchant sees on the log file (FIG. 8) all his sales, with each sale against a charge function brand used to make the payment and also (optionally,) a separation between smaller and larger sales. This list is submitted for claiming the respective totals, minus the agreed fees, from the respective card brand issuers. This is the normal way of doing business with charge cards. Thus, the entire concept of electronic cash actually becomes invisible to the merchant!

2. The card issuer sees four numbers at the bottom line (FIG. 9):
   (a) The total 91 of all charges of $25 or more made to customer cards. These are conventional charges, processed by the regular processing means and under standard customer-issuer terms. (actually, the issuer receives the details of each transaction for processing.) Optionally, the charges of $25 for reloading the electronic purse with change can be separated from the charges of $25 or more for direct payment via the charge card, if different customer fees are involved.
   (b) The smaller and higher merchant claim totals 92 and 93, to be paid to the merchant after fee deduction; this is unconventional, new feature as the actual payment has been made with either electronic cash or $25 charge and electronic cash returned as change. However, the concept of electronic cash as a fraction of charge transaction (see the brief summary) explains and justifies this approach. There are small differences, negative or positive, between the customer charges and the merchant claims; these are statistical fluctuations of the zero average, and they compensate over time and over a large number of points of sale. Thus, merchant claims actually equal customer charges, balancing the system integrity as a whole.
   (c) an electronic cash adjustment 94, which closes the accounting loop locally and temporarily, to compensate for the statistical fluctuations from the zero average.

3. It can be seen, that the total adjustment 95 made among the various issuers by the transaction processor ($80.83 in this example) is small compared to the total revenues involved, and is exactly the same as the adjustment amount 79 (FIG. 7) made at the POS for returning the POS to the baseline of $750 toward the next business cycle. Thus, the settlement transaction is perfectly balanced.

4. It should be noted that, while settlement transactions are charge function brand specific to the penny and are settled under conventional charge fee schemes with each charge function issuer, the electronic cash stored and flowing through the system for card preloading, POS priming, payment, change, POS adjustment and settlement adjustment, is actually brandless. Thus a common pool of electronic cash, flowing freely among stored-value devices as needed, enables brand-separated commerce (possibly under different fee schemes) while the system's integrity and flawless accounting are maintained. This is a major achievement of the present invention and its major scope.

Settlement in an Issuer-Acquirer Environment

In many card payment setups, settlement is divided between acquirers, which handle the merchant side, and issuers, which handle the customer side. In such a typical environment, acquirers sign merchants on contracts which specify which charge function brands a merchant agrees to accept and under what fee terms, while issuers sign customers on their charge function usage terms and fees. On settlement in such environments, the merchant submits the credit and debit slips to his acquirer, which pays the merchant the total slip amount minus a "Merchant Service Charge" (sometimes called "the Merchant Discount"), e.g., a percentage of the total, calculated separately for each fee scheme which has been accepted by the merchant. The acquirer then submits these slips, via a complex and sophisticated settlement network, to the various issuers. Each respective issuer then returns to the acquirer the total of the received slips, minus an "Interchange Fee", which is substantially smaller than the corresponding merchant service charge. Thus, the issuer revenue includes the interchange fee, while the acquirer revenue includes the difference between the merchant service charge and the interchange fee.

The present invention, in one of its variations, aims at minimizing the changes needed to be made in the acquirer-issuer settlement network and procedures. This variation is described herein in reference to FIG. 10 in addition to FIG. 9.

Figure 10:
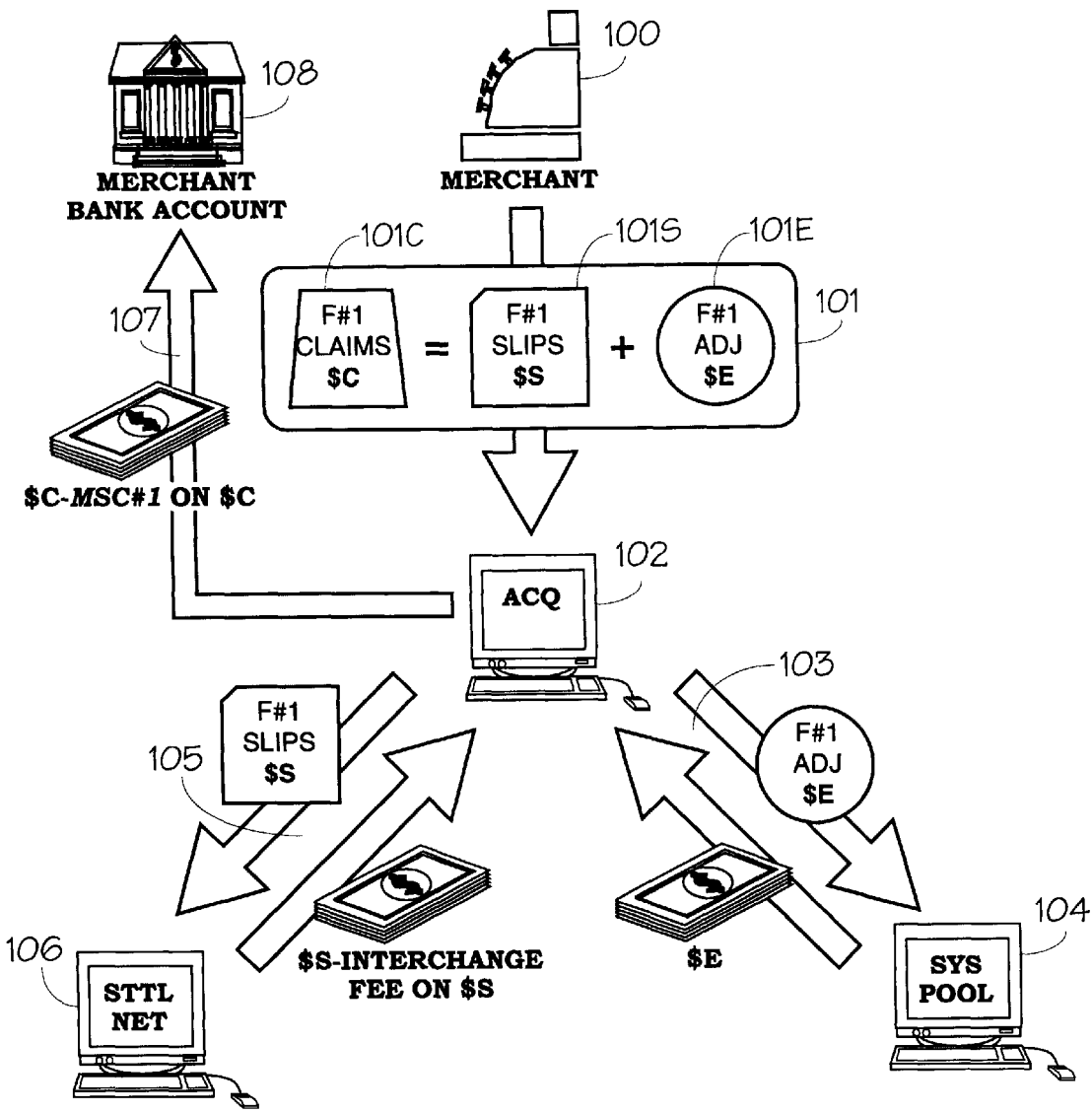
FIG. 10 shows the settlement of transactions from issuer to acquirer.

FIG. 10 shows that at the end of the business cycle, a merchant computer 100 communicates with an acquirer computer 102 for settlement. Merchant computer 100 can be a single POS, or a merchant's office computer which collects charge slips and electronic cash, and submits them along with transaction records for settlement. Merchant computer 100 may also be able to consolidate charge slips, electronic cash, and transaction records for a plurality of merchant's POS. The discussion below focuses on a single fee scheme F#1 for small purchases, for instance Fee 1 of Card-1 of FIG. 9.

Relating to fee scheme F#1, merchant computer 100 presents to acquirer computer 102 data file 101, which includes: item 101C—the consolidated claim for an amount $C=$1072.90 (FIG. 9) which is based on actual small sales made according to fee scheme F#1; item 101S—the charge slips collected from change transactions (step 5-8 in FIG. 5), whose total is $S=$1100.00=$1574.55−474.55 (FIG. 9); and item 101E—electronic cash adjustment of $E=−27.10 (FIG. 9). Note that data file 101 can be a summary or consolidation of the transaction records from the merchant's points of sale. In this context, a "computer" such as merchant computer 100 or acquirer computer 102, can be any system, device, or set of devices, including, but not limited to a conventional computer or a computer network, which is capable of presenting and accepting data files as described herein.

As shown in FIG. 10, acquirer computer 102 receives charge slips, electronic cash, and claims from merchant computer 101, and makes conventional monetary payments to the merchant based on the amount $C of the claims, less a merchant service charge.

According to the rules and mechanisms described herein, the system maintains $$\$C=\$S+\$E \tag{3}$$

That is, merchant claims are paid for by slips and by electronic cash. Conversely, the electronic cash involved in the settlement is:

$$\$E=\$C-\$S \tag{4}$$

According to an embodiment of the present invention, the acquirer settlement 107 with the merchant is based exactly on actual sales $C, i.e., the merchant receives to his bank account 108 $C minus the appropriate merchant service charge. To perform acquirer settlement, acquirer computer 102 initiates transactions, directly or indirectly with merchant, optionally via merchant bank account 108, in order to make a conventional monetary payment to the merchant. For example, acquirer computer 102 could simply send the merchant a check. The acquirer settlement 105 with the F#1 issuers via settlement network 106 is based on normal processing of F#1 slips, conforming to exiting networks and procedures, thus yielding for the acquirer the total value of slips $S minus the interchange fees on these slips. Also, in an adjustment flow 103 the acquirer settles with a central electronic cash pool 104 the amount positive or negative) of adjustment $E, which is made by conventional monetary payment. Electronic cash pool 104 stores electronic cash and exchanges electronic cash with acquirer computer 102 for conventional monetary payment.

It can be easily seen that the merchant faces an acceptable fee scheme according to his actual sales, while the issuer collects acceptable, "normal" fees based on the submitted slips. Also, the settlement process according to the present invention makes the most of existing settlement networks 106. Settlement network 106 receives charge slips totaling $S from acquirer computer 102 and returns a conventional monetary payment for the charge slips, in the amount $S minus the interchange fee, to acquirer 102. It is the responsibility of settlement network 106 to settle payment of the charge slips with the holders of the payment cards. In this regard, settlement network 106 can be a current "conventional" charge settlement network according to the prior art.

The main difference is with the acquirer fee. Based on F#1 slips, in the previous, conventional system an acquirer would receive from an issuer the amount $A_{conventional}$:

$$\$A_{conventional}=\$S-I(\$S) \tag{5}$$

where I($) is the interchange fee on $S.

Furthermore, according to the conventional system, the acquirer pays the merchant $M_{conventional}$ $$\$M_{conventional}=\$-D(\$S) \tag{6}$$

where D($S) is the merchant service charge on $S.

According to the embodiment under discussion, the acquirer collects from issuers the same amount as before ($A_{conventional}$), but pays the merchant $M_{settle}$:

$$\$M_{settle}=\$C-D(\$C) \tag{7}$$

and receives an adjustment amount of $E in electronic cash. Both $C, D($C), and $E are as previously defined. The net fee remaining with the acquirer in the conventional scheme, denoted herein as $R_{conventional}$, is:

$$\$R_{conventional}=D(\$S)-I(\$S) \tag{8}$$

and according to the embodiment of the present invention the net fee remaining with the acquirer, denoted herein as $R_{settle}$ is:

$$\$R_{settle}=D(\$S)-I(\$C) \tag{9}$$

The difference between the acquirer's conventional net fee and the acquirer's net fee according to the present invention is:

$$\$R_{conventional}-\$R_{settle}=I(\$C)-I(\$S) \tag{10}$$

In a fixed percentage-based fee scheme, this is:

$$\$R_{conventional}-\$R_{settle}=I(\$C-\$S), \tag{11}$$

and, using Equation (4), this is:

$$\$R_{conventional}-\$R_{settle}=I(\$E). \tag{12}$$

In other words, the difference between the conventional net fee and that according to the present invention is the interchange fee calculated on $E, where $E is the amount presented at electronic cash pool 104 for adjustment. $E (made in a conventional monetary payment) can be negative or positive, and statistically averages to zero.

Thus in the embodiment under discussion, the acquirer collects fees which deviate slightly from the "normal" fees collected according to slips. Sometimes this small deviation will be positive and at other times negative so that the average is zero. One approach for handling these deviations is simply to accept them, since statistically they have no net effect. An alternative approach is in recording electronic cash adjustments with system electronic cash pool 104 along with the respective merchant service charges, and creating a mutual inter-acquirer fee adjustment mechanism, to compensate for such deviations.

Multiple Charge Functions on a Single Payment Card

In another embodiment of the system according to the present invention, a payment card known as a "multiple charge function payment card" contains a plurality of different brands of charge functions. For example, a single such payment card might have both a credit and debit charge function. In such a case, the customer would select which of the various charge functions to use for a particular purchase (provided, of course, that the merchant honors the chosen charge function). Continuing with this example, the customer might wish to make a $50 purchase using the payment card's debit charge function, but might wish to make a $500 purchase using the payment card's credit charge function, even though there might be a sufficient balance in the debit account to cover the purchase.

Multiple charge function payment cards can be used in a system of isolated flow (FIG. 1A, FIG. 1A, FIG. 2, and FIG. 3) or in a system of zero average flow (FIG. 4, FIG. 4A, FIG. 5, FIG. 6, and FIG. 7).

Figure 11:
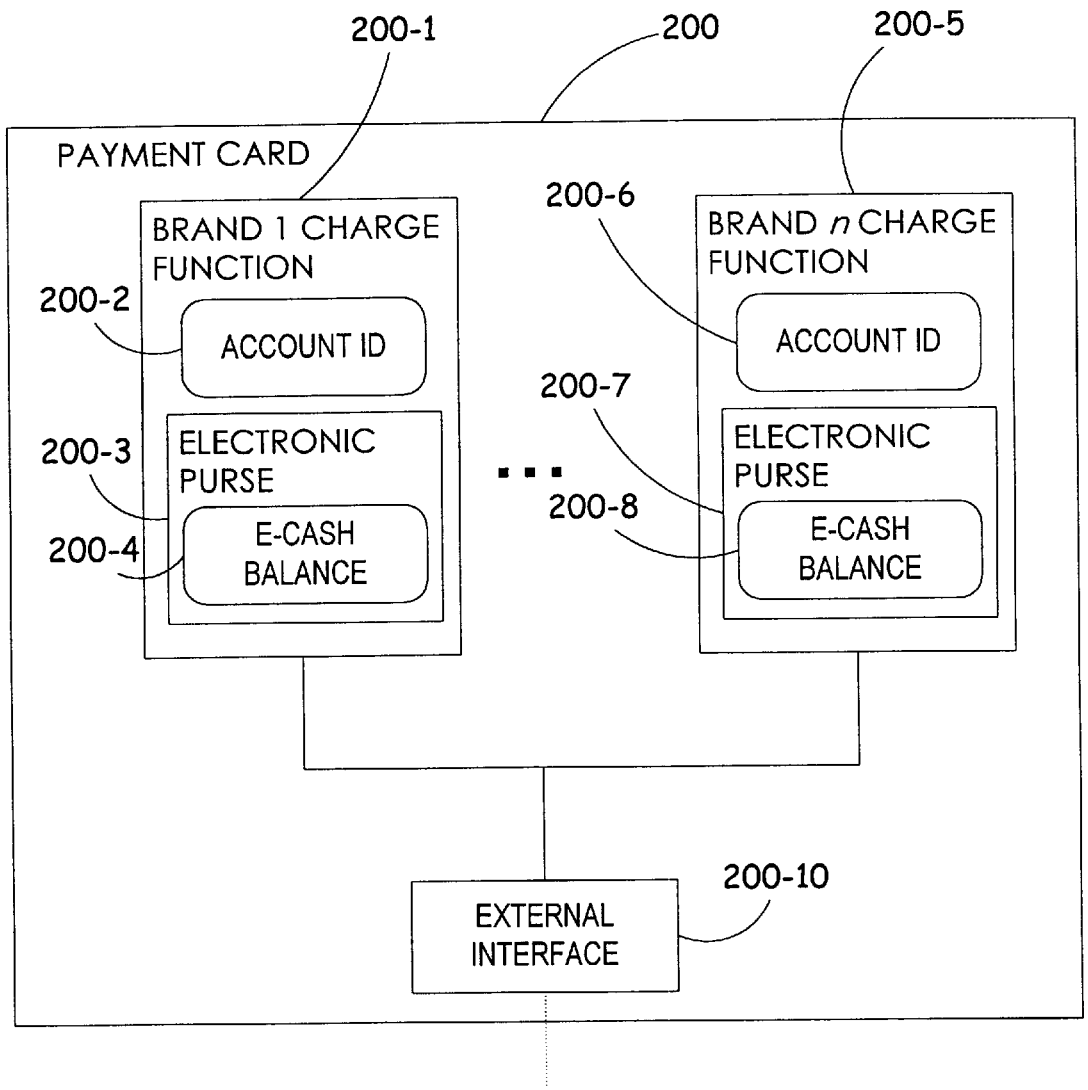
FIG. 11 shows the organization of an embodiment of a multiple charge function payment card suitable for use in a heterogeneous environment involving isolated flow.

FIG. 11 illustrates an embodiment of a multiple charge function payment card which is suitable for use in a system of isolated flow according to the present invention. Multiple charge function payment card 200 contains an external interface 200-10, and a plurality of branded charge functions illustrated as 200-1 and 200-5, which respectively have account ID 200-2 and account ID 200-6; and which respectively have electronic purse 200-3 with electronic cash balance 200-4, and electronic purse 200-7 with electronic cash balance 200-8. The ellipsis ( . . . ) indicates that additional charge functions can also be present on payment card 200.

When used in a system of isolated flow, multiple charge function payment card 200 is loaded with electronic cash at loading device 2 (FIG. 1 and FIG. 1A) according to the brand of the desired charge transaction selected by customer 13 (FIG. 1A). For example, a customer might usually wish to reload the payment card with electronic cash using a debit charge transaction, but may occasionally desire to reload the payment card with electronic cash using a credit charge transaction. At the time of loading the multiple charge function payment card with electronic cash, the electronic cash would be Brand 1 or Brand n (in FIG. 11) and would be placed into electronic purse 200-3 or electronic purse 200-7, respectively (FIG. 11). Thereafter, the electronic cash in electronic purse 200-3 would be associated with Brand 1, and the electronic cash in electronic purse 200-7 would be associated with Brand n. Furthermore, as the electronic cash flows (FIG. 2) from payment card 23 to POS 26 and to financial institution 20, this association of electronic cash with the particular brand by which the loading was accomplished is maintained by all devices which perform transactions with the electronic cash. Note that in the embodiment of FIG. 11, each electronic purse has an implicit contents brand ID register in its brand identifier. That is, the contents brand ID register of each electronic purse is permanently assigned for the payment card.

Figure 12:
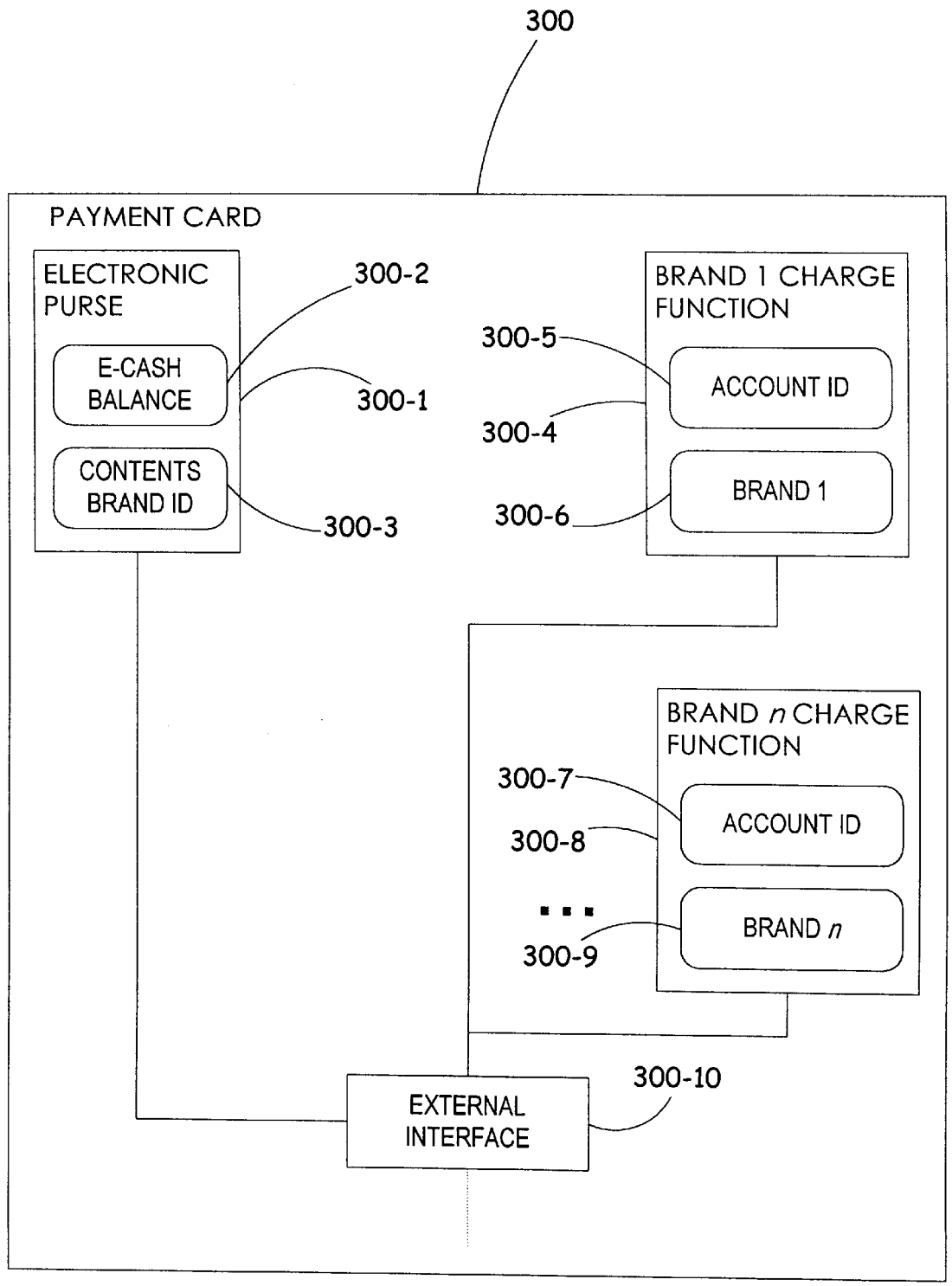
FIG. 12 shows the organization of another embodiment of a multiple charge function payment card suitable for use in a heterogeneous environment involving zero average flow.

FIG. 12 illustrates another embodiment of a multiple charge function payment card 300 for use in a system of zero average flow according to the present invention. Similar to payment card 8 in FIG. 4A, payment card 300 contains an external interface 300-10, and a single electronic purse 300-1 which has an electronic cash balance 300-2. In addition, however, electronic purse 300-1 also has an explicit contents brand ID register 300-3 which associates the electronic cash in electronic purse 300-1 with a specific charge function brand. Furthermore, instead of a single charge function 8-6 (FIG. 4A), payment card 300 has multiple charge functions, illustrated as a Brand 1 charge function 300-4 and a Brand n charge function 300-8. The ellipsis ( . . . ) indicates that additional charge functions can also be present on payment card 300. Charge function 300-4 has an account ID 300-5 and a brand 300-6. Charge function 300-8 likewise has an account ID 300-7 and a brand 300-9. The specific charge function which was most recently used in a charge transaction is identified by having its brand indicated in contents brand ID register 300-3. In effect, then, electronic purse 300-1 contains electronic cash associated with the specific charge function which was most recently used in a charge transaction. For example, if contents brand ID register 300-3 indicates Brand 1 300-6, then this means that electronic cash balance 300-2 was acquired through a transaction involving Brand 1 300-6. Note that in the embodiment of FIG. 12, contents brand ID register 300-3 is writeable and its value may be reassigned.

Figure 13:
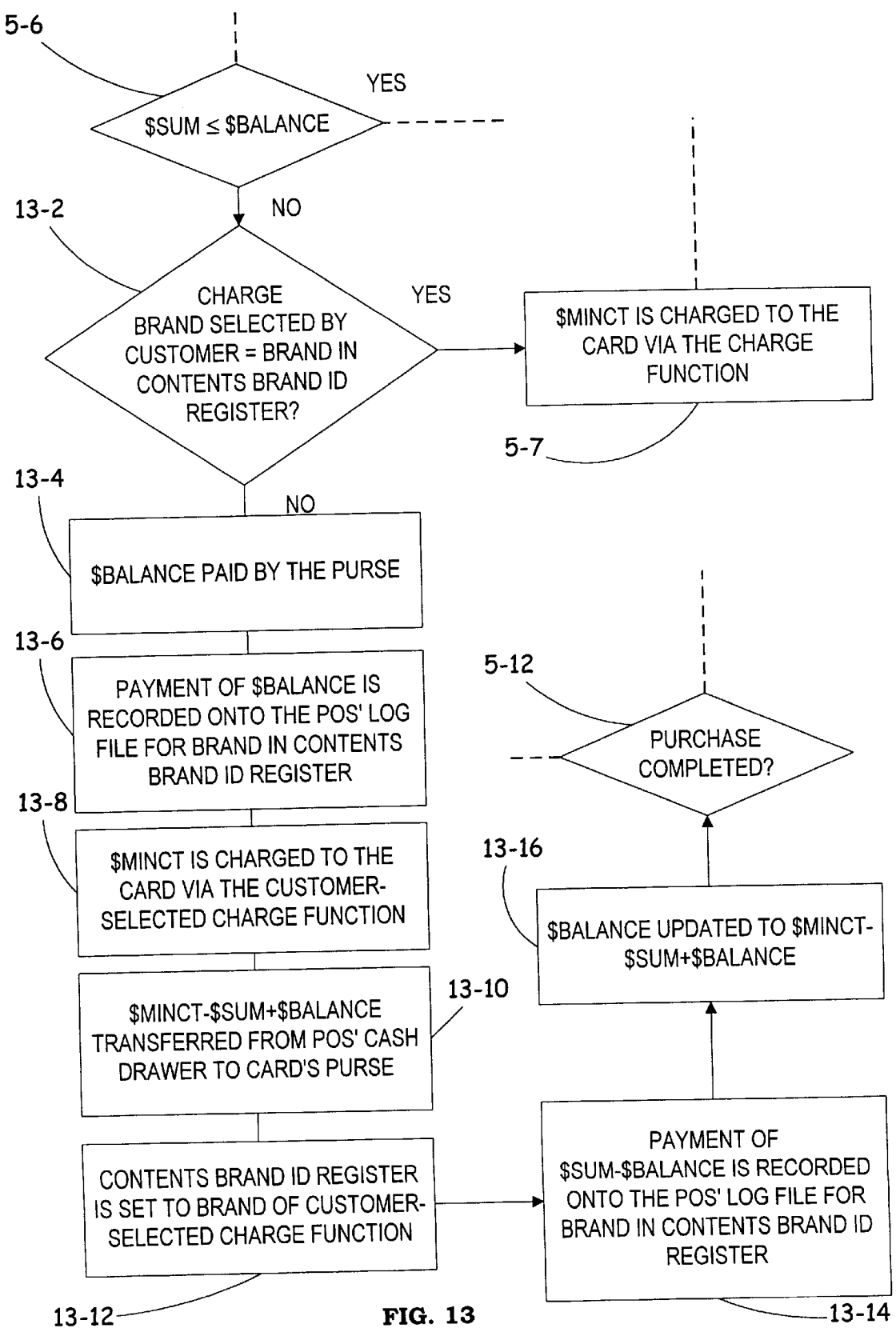
FIG. 13 is a flowchart showing the additional operations of an automatic change manager for a multiple charge function payment card in an environment of zero average flow.

When used in a system of zero average flow, multiple charge function payment card 300 is automatically reloaded with electronic cash as change at a POS whenever the purchase amount exceeds the amount of electronic cash in the electronic purse of the payment card (FIG. 4 and FIG. 4A) according to the brand of the desired charge function selected by customer 13 for the charge transaction (FIG. 4A, with operation as detailed in FIG. 5). Thus it is necessary to have a way of associating a charge function brand with the electronic cash in the single electronic purse 300-1 of multiple charge function payment card 300, via contents brand ID register 300-3. Although the decision procedures for determining change are basically the same for a multiple charge function payment card as that of a regular (single charge function) payment card (as previously set forth), the multiple charge function payment card has additional steps to insure that all the electronic cash in the electronic purse is associated with a single charge function brand (the brand which is indicated by contents brand ID register 300-3). If the purchase amount is greater than or equal to the minimum charge transaction, then no change is involved, and the processing of a purchase using a multiple charge function payment card is handled the same as that using a regular payment card as shown in FIG. 5. Likewise, if the purchase amount does not exceed the balance of electronic cash in the electronic purse of the multiple charge function payment card, then no change is involved, and the processing of a purchase using a multiple charge function payment card is also handled the same as that using a regular payment card as shown in FIG. 5. If, however, the purchase amount is less than the minimum charge transaction but greater than the balance of electronic cash in the electronic purse, then change is involved, and some additional steps are needed to insure that all the electronic cash in the electronic purse of the multiple charge function payment card is associated with a single charge function brand (the brand which is indicated by contents brand ID register 300-3). FIG. 13, to which reference is now made, shows the steps for a multiple charge function payment card that are executed when the purchase amount is less than the minimum charge transaction but greater than the balance of electronic cash in the electronic purse.

In FIG. 13, the processing begins at the output of step 5-6 (as in FIG. 5) where the payment sum exceeds the electronic cash balance in the electronic purse of the multiple charge function payment card ($SUM≦$BALANCE is not the case, i.e., $SUM>$BALANCE). At this point it will be necessary to conduct a charge transaction, and in a multiple charge function payment card, it is the customer who determines the brand of this charge transaction. Therefore, in a decision point 13-2, the customer's choice of charge function brand for the charge transaction is compared against the brand associated with electronic cash in the electronic purse as indicated in contents brand ID register 300-3. If the customer selects the same charge function brand then the remainder of the transaction is handled exactly the same as in a regular charge card, and processing resumes at step 5-7 of FIG. 5. If, however, the customer selects a different charge function brand for the present charge transaction than that which is associated with the balance in the electronic purse (according to contents brand ID register 300-3), then the existing electronic cash in the electronic purse must be somehow removed and accounted for before electronic cash associated with a different charge function brand can be loaded into the electronic purse. Otherwise, electronic cash associated with diverse charge function brands will be intermixed in the electronic purse, thereby rendering it impossible to properly settle and account for. Therefore, in a step 13-4, the entire balance ($BALANCE) of electronic cash in the electronic purse is paid toward the purchase ($SUM), thereby emptying the electronic purse. Then, in a step 13-6, the payment of $BALANCE is recorded into the log file of the POS for the brand indicated by the contents brand ID register 300-3 (FIG. 12) of the multiple charge function payment card. This is in keeping with the fact that the electronic cash which was just transferred out of the electronic purse is associated with the charge function brand indicated by the contents brand ID register 300-3, and continues to maintain that association through ultimate transfer to the financial institution. Next, in a step 13-8, the minimum charge transaction amount $MINCT is charged to the multiple charge function payment card via the charge function which was selected by the customer. Now at this point, the previous balance of the electronic purse has already been paid against the purchase amount $SUM, so the amount due on the purchase is $SUM-$BALANCE, where $BALANCE is the original amount of electronic cash in the electronic purse at the start of the transaction. Thus, the change to be returned to the multiple charge function payment card by the POS is $MINCT-$SUM+$BALANCE, and in a step 13-10, the POS transfers this amount into the electronic purse of the multiple charge function payment card. Since the electronic cash representing this amount is associated with the brand of charge transaction selected by the customer, in a step 13-12, the contents brand ID register 300-3 is set to the brand selected by the customer. The remaining amount due on the purchase ($SUM-$BALANCE) has been paid via the charge transaction, so in a step 13-14 the payment of $SUM-$BALANCE is recorded by the POS in the log file for the brand selected by the customer (which is the brand now indicated by contents brand ID register 300-3). Finally, in a step 13-16, the value of $BALANCE is updated to the new value of $MINCT-$SUM+$BALANCE. The value of $BALANCE is stored in register 300-2 of the multiple charge function payment card (FIG. 12). At this point, the processing returns to decision point 5-12 as in FIG. 5 for a regular payment card.

Note that it is also possible to optionally omit decision point 13-2 and proceed directly to step 13-4 regardless of the customer's choice of brand for the charge transaction. This produces the same overall net effect, but if the customer selects the same charge function brand for the charge transaction as is already associated with electronic cash in the electronic purse, the purchase transaction will be needlessly and artificially broken into two pieces and recorded as such in the log file of the POS. One piece will involve the electronic cash in the electronic purse, and the other piece will involve the charge transaction. They will, of course, add up to the amount of the purchase ($SUM) and will both be associated with the same brand of charge transaction.

Additional POS Features

Figure 14:
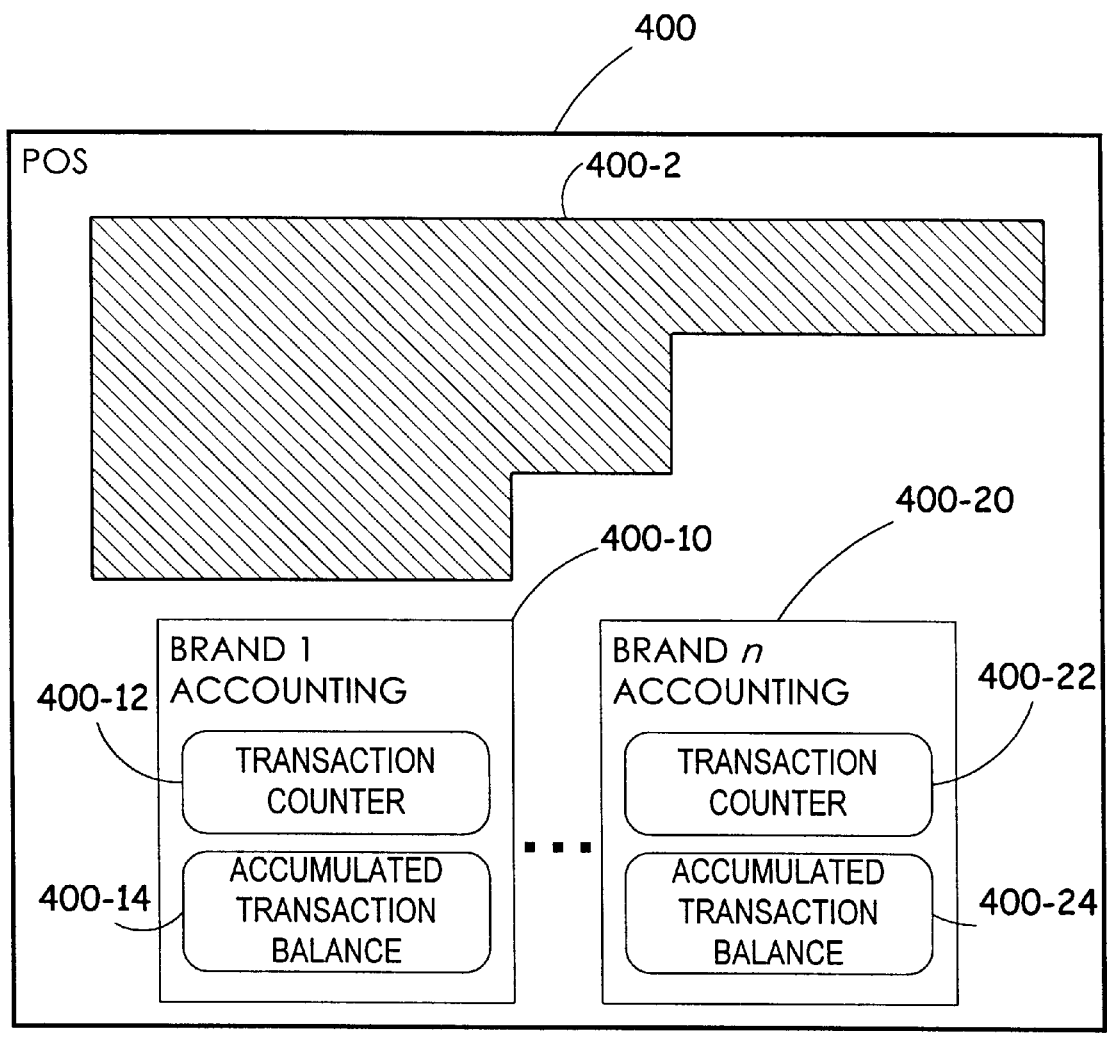
FIG. 14 shows advanced accounting features of a POS regarding the handling and settlement of charge transactions in a heterogeneous environment.

The features of a point of sale (POS) according to the present invention as described previously and as illustrated in FIG. 1A and FIG. 4A are sufficient for basic operation of a heterogeneous electronic cash system. In a further embodiment, however, there are additional features to provide enhanced accounting and ease of use in a multiple POS environment. FIG. 14, to which reference is now made, illustrates these additional features.

An advanced POS 400 contains aggregate features 400-2 at previously described. In the case of a POS used in an environment of isolated flow (FIG. 1A) the basic POS is illustrated by POS 6, and aggregate features 400-2 include log file 6-1, payment sum 6-2, electronic purse payment unit 6-3, electronic cash drawer 6-4, card interface 6-5, transaction manager 6-6, customer interface 6-7, electronic safe 6-8, charge transaction unit 6-9, and processor interface 6-11. In the case of a POS used in an environment of zero average flow (FIG. 4A) the basic POS is illustrated by POS 41, and aggregate features 400-2 include log file 41-1, payment sum 41-2, electronic purse payment unit 41-3, electronic cash drawer 41-4, card interface 41-5, auromatic transaction manager 41-6, customer interface 41-7, electronic safe 41-8, charge transaction unit 41-9, electronic purse loading unit 41-10, and processor interface 41-11. The additional features of advanced POS 400 include brand accounting modules for each brand accepted by POS 400, illustrated as a Brand 1 brand accounting module 400-10 and a Brand n brand accounting module 400-20. These brand accounting modules contain registers such as transaction counters 400-12 and 400-22, respectively, and accumulated transaction balance registers 400-14 and 400-24, respectively. Such counters and registers are additional examples of transaction records, as previously defined. The ellipsis ( . . . ) indicates that further brands may be represented with brand accounting modules. For each transaction performed with a specific brand, the respective transaction counter is incremented and the respective accumulated transaction balance register is updated to reflect the total transaction amount seen for the specific brand. The accounting information contained in the brand accounting module can be used in a variety of ways. For example, the settlement terms for a particular brand may be conditioned on the number of transactions conducted for that brand. For advanced POS 400, this number is contained in the transaction counter (400-14, 400-24) of the brand accounting module (400-10, 400-20) of advanced POS 400. As another example, a merchant may have a large number of points of sale and may wish to consolidate the transaction totals for each brand directly from those points of sale without having to extract and compile data from log files 6-1 (FIG. 1A) or 41-1 (FIG. 4A). The transaction totals for the respective brands are contained in accumulated transaction balance registers 400-14 and 400-24. The brand accounting modules 400-10 and 400-20 can be reset to zero as desired.

While the invention has been described with respect to a limited number of embodiments, it will be appreciated that many variations, modifications and other applications of the invention may be made.

What is claimed is:

1. A heterogeneous electronic cash payment system having at least two different brands of charge function, each brand having loading terms and settlement terms, the heterogeneous electronic cash payment system comprising:
   (a) a plurality of payment cards, each payment card belonging to a customer, each payment card having at least one charge function to a remotely chargeable account of said customer, and at least one electronic purse operative to containing electronic cash and having a contents brand ID register for associating a charge function brand with said electronic cash;
   (b) at least one loading device operative to interfacing with a specified payment card, adding electronic cash to the electronic purse of said specified payment card against payment from a selected charge function according to the loading terms of the brand of said selected charge function;
   (c) at least one point of sale having a transaction record and an electronic cash drawer for storing electronic cash, said point of sale operative to interfacing with a presented payment card of said plurality of payment cards, receiving an electronic cash payment from said presented payment card, reading the brand of a predetermined charge function of said presented payment card, depositing said electronic cash payment in said electronic cash drawer, and recording said electronic cash payment along with said brand of a predetermined charge function onto said transaction record; and
   (d) a settlement system operative to settling electronic cash payments according to the settlement terms of the brands of charge functions associated with said electronic cash payments.

2. The system of claim 1, wherein said point of sale is further operative, upon communicating with a payment card and reading the brand of said payment card, to selectively accept or reject said payment card for payment.

3. The system of claim 1, wherein a first payment card is not allowed to transfer electronic cash to a second payment card whose charge function is of a brand different from the charge function of said first payment card, and wherein a point of sale is allowed to transfer electronic cash only to a settlement system.

4. The system of claim 1, wherein the brand associated with said contents brand ID register is predetermined and may not be changed.

5. The system of claim 1, wherein the brand associated with said contents brand ID register may be changed.

6. The system of claim 1, wherein said transaction record comprises a sequential data file.

7. The system of claim 1, wherein said transaction record comprises a cumulative register.

8. The system of claim 1, wherein at least one of said loading devices is contained within an enhanced point of sale, said enhanced point of sale being operative, upon interfacing with a presented payment card chosen for paying a payment sum according to a specified charge function selected from said at least one charge function, said loading terms stipulating a predetermined reload sum, to automatically determine whether to:
   i) charge the predetermined reload sum to the specified charge function;
   ii) return to the electronic purse of said payment card as change an amount of electronic cash equal to the difference between said predetermined reload sum and the payment sum; and
   iii) record the payment sum and the brand of said specified charge function onto said transaction record.

9. The system of claim 1, wherein said settlement system is further operative to communicating with a selected point of sale and transferring electronic cash with the electronic cash drawer of said selected point of sale.

10. The system of claim 1, wherein said settlement system comprises:
    i) a merchant computer owned by a merchant operative to collecting and submitting charge slips, transaction records, and electronic cash;
    ii) a settlement network operative to receiving charge slips and issuing conventional monetary payment therefor;
    iii) an electronic cash pool operative to storing electronic cash and exchanging electronic cash for conventional monetary payment; and
    iv) an acquirer computer operative to:
       receiving charge slips and electronic cash;
       making conventional monetary payment to said merchant;
       exchanging electronic cash with said electronic cash pool for conventional monetary payment; and
       submitting charge slips to said settlement network in exchange for conventional monetary payment.

11. The system of claim 1, wherein said at least one point of sale includes a plurality of brand accounting modules, each of which contains at least one register selected from the group consisting of a transaction counter and an accumulated transaction balance register.

12. The system of claim 1, wherein at least one of said plurality of payment cards is a multiple charge function payment card containing a plurality of charge functions of different brands.

13. The system of claim 8, wherein said enhanced point of sale, upon determining to add said difference into said electronic purse, subtracts said difference from the electronic cash accumulated in the electronic cash drawer of said enhanced point of sale.

14. The system of claim 12, wherein each of said plurality of charge functions contains an electronic purse having an electronic cash balance.

15. The system of claim 12, wherein said multiple charge function payment card contains a single electronic purse having an electronic cash balance and a contents brand ID register which associates the electronic cash in said single electronic purse with a specific charge function brand.

16. A method for managing a heterogeneous electronic cash environment, the environment having a plurality of charge function brands, each brand having loading terms and settlement terms, the environment further having a plurality of payment cards, each payment card having an electronic purse and a contents brand ID register, the environment further having at least one loading device and at least one point of sale with an electronic cash drawer and a transaction record, the environment further having a settlement system, the method comprising the steps of:

(a) interfacing a selected payment card to a loading device, initiating a charge transaction with a charge function of said selected payment card, transferring electronic cash into the electronic purse of said selected payment card according to the loading terms for the brand of said charge function, and setting the contents brand ID register of said selected payment card to said brand of said charge function;

(b) interfacing a presented payment card to a specified point of sale, transferring an electronic cash payment from the electronic purse of said presented payment card to the electronic cash drawer of said specified point of sale, and recording the brand set in the contents brand ID register of said presented payment card onto the transaction record of said specified point of sale; and (c) settling said electronic cash payment through the settlement system according to the settlement terms of the brand recorded onto said transaction record.

17. A method for associating a new charge function brand with electronic cash returned as change from a purchase transaction to a multiple charge function payment card having a single electronic purse, the purchase transaction having a sum and being made via the new charge function brand, the single electronic purse containing a balance of electronic cash associated with a previous charge function brand, the single electronic purse having a contents brand ID register indicating the charge function associated with the electronic cash contained in the single electronic purse, the method comprising the steps of:

(a) paying the balance of electronic cash in the single electronic purse toward the sum of the purchase transaction, the payment being associated with the previous charge function brand;

(b) charging a predetermined minimum charge transaction amount to the new charge function brand;

(c) returning, as change, an amount of electronic cash to the electronic purse equal to said predetermined minimum charge transaction amount plus the balance less the sum of the purchase transaction; and (d) setting the contents brand ID register to indicate the new charge function brand.

* * * * *